United States Patent [19]

Hiramoto et al.

[11] Patent Number: 5,041,939
[45] Date of Patent: Aug. 20, 1991

[54] MAGNETIC TAPE CASSETTE WITH LEAF-SHAPED SPRING DOOR CLOSURE MECHANISM

[75] Inventors: Tsutomu Hiramoto; Masayuki Komeiji; Kimimoto Hirose; Hitoshi Okubo; Minoru Sato, all of Tamaho; Yoshitaka Yasufuku, Hino, all of Japan

[73] Assignee: Konica Corporation, Tokyo, Japan

[21] Appl. No.: 512,127

[22] Filed: Apr. 17, 1990

Related U.S. Application Data

[63] Continuation of Ser. No. 196,222, Apr. 22, 1988, Pat. No. 4,951,167.

[30] Foreign Application Priority Data

| Aug. 25, 1986 | [JP] | Japan | 61-129165 |
| Aug. 26, 1986 | [JP] | Japan | 61-129632 |
| Aug. 26, 1986 | [JP] | Japan | 61-129634 |
| Sep. 8, 1986 | [JP] | Japan | 61-137785 |
| Sep. 8, 1986 | [JP] | Japan | 61-137786 |
| Sep. 17, 1986 | [JP] | Japan | 61-142427 |
| Sep. 17, 1986 | [JP] | Japan | 61-142428 |
| Sep. 22, 1986 | [JP] | Japan | 61-145702 |
| Oct. 1, 1986 | [JP] | Japan | 61-151063 |
| Oct. 2, 1986 | [JP] | Japan | 61-151808 |
| Oct. 20, 1986 | [JP] | Japan | 61-160740 |
| Oct. 20, 1986 | [JP] | Japan | 61-160741 |
| Dec. 8, 1986 | [JP] | Japan | 61-189500 |
| Apr. 15, 1987 | [JP] | Japan | 62-57118 |
| Apr. 15, 1987 | [JP] | Japan | 62-57119 |
| Apr. 16, 1987 | [JP] | Japan | 62-57933 |

[51] Int. Cl.[5] ............................................. G11B 23/02
[52] U.S. Cl. ..................................................... 360/132
[58] Field of Search ................. 360/132; 242/197–199

[56] References Cited

U.S. PATENT DOCUMENTS 4,591,936 5/1986 Kikuya .............................. 360/132
4,626,948 12/1986 Tanaka ............................. 360/132

FOREIGN PATENT DOCUMENTS 125688 11/1984 European Pat. Off. .
3408366 9/1984 Fed. Rep. of Germany .
2157265 10/1985 United Kingdom .

Primary Examiner—A. J. Heinz
Attorney, Agent, or Firm—Jordan B. Bierman

[57] ABSTRACT

The present invention relates to a magnetic tape cassette comprising upper and lower halves of cassette forming the cassette body wherein supply and take-up reels for a tape are to be loaded, a front cover that swivels and covers rotatably the front side of the cassette where the tape runs and a front cover spring that keeps causing the front cover to be swiveled in one direction.

In the upper half of cassette offered by the invention, the side wall of the upper half of cassette is provided with a loading opening, and when a shaft provided on the front cover for supporting the front cover when it swivels or rotates is positioned at the corner of the loading opening, it is possible to mount the front cover regularly and finally only on the upper half of cassette owing to a stopper protrusion that checks the downward movement of the shaft provided on the front cover and a slip-prevention protrusion that checks the forward movement of the same shaft.

3 Claims, 27 Drawing Sheets

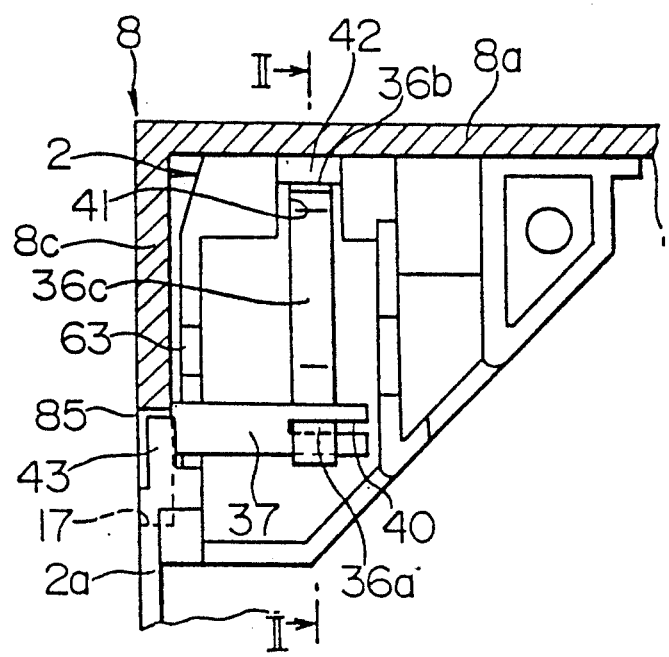

MAGNETIC TAPE CASSETTE WITH LEAF-SHAPED SPRING DOOR CLOSURE MECHANISM

This application is a division of application Ser. No. 196,222, filed Apr. 22, 1988, now U.S. Pat. No. 4,951,167 which claims the priority of Japanese Patent Application (JPA) 129,165 filed Aug. 25, 1986, JPA 129,632, filed Aug. 26, 1986, JPA 129,634, filed Aug. 26, 1986, JPA 137,785, filed Sept. 8, 1986, JPA 137,786, filed Sept. 8, 1986, JPA 142,427, filed Aug. 17, 1986. JPA 142,428, filed Sept. 17, 1986, JPA 145,702, filed Sept. 22, 1986, JPA 151,063, filed Oct. 1, 1986, JPA 151,808, filed Oct. 2, 1986, JPA 160,740, filed Oct. 20, 1986, JPA 160,741, filed Oct. 20, 1986, JPA 189,500, filed Dec. 8, 1986, JPA 57118, filed Apr. 15, 1987, JPA 57119, filed Apr. 15, 1987, and JPA 57933, filed Apr. 16, 1987.

FIELD OF THE INVENTION

The present invention relates to a magnetic tape cassette for insertion in a video tape recorder (VTR) with its front portion facing the VTR and, more particularly to a hingelike structure of the front cover mounted on the front portion of the cassette body.

PRIOR ART

FIGS. 4-50 show a conventional magnetic tape cassette for home use, FIG. 45 shows a rear view with a partial cutout viewed from the lower half side of the magnetic tape cassette, FIG. 46 is a cross-sectional view taken on line X III-X III of FIG. 45, FIG. 47 is a partially cut view taken on line X IV-X IV of FIG. 47, and FIG. 48 is a partial view of a corner portion of a lower half corresponding positionally to a cutout at the top of the left side of FIG. 45.

Cassette body 4 of magnetic tape cassette 1 is composed of upper half 2 and lower half 3. There are provided in cassette body 4 a pair of reels around which magnetic tape 5 is wound, one of which is supply reel 6 and the other is take-up reel 7. On the front of cassette body 4 to be inserted into a VTR with its front facing the VTR, there is provided front cover 8 that covers magnetic tape 5 fed from reel 6 onto reel 7 and running on the front face of tape guide means 4a, 4a so that the front cover can be opened and closed.

On the front of cassette body 4, there are provided guide groove 4b to engage an actuator of the VTR to open front cover 8, cutout 4c to accept a pinch roller, and cutouts 4d and 4e to accept a loading mechanism. Tape guide portions 4a, 4a are located between cutouts 4c and 4d and between 4d and 4e respectively.

Front cover 8 is in a flat U-shaped form with its side plates 8c and 8d extending at both sides of front plate 8a and top plate 8b. Inside of side plate 8d, rotating pivot 10 protrudes therefrom and is inserted and supported in the through hole on the front portion of the side wall of upper half 2.

Rotating shaft 9 projects inside of side plate 8c, and is longer than rotating pivot 10 and protrudes therefrom. Front cover spring 12 in a coil form is attached to the rotating shaft 9, so that front cover 8 is urged toward the closed position.

Front cover spring 12 is mounted so that coil portion 12a is surrounds rotating shaft 9, fixed end 12b is hooked on hook pin 13 on rotating shaft 9, and free end 12c loosely engages guide groove 14 formed on the internal surface of upper half 2.

At the portion of side wall 2a of upper half 2 corresponding positionally to side plate 8c of the front cover 8 on which rotating shaft 9 is provided, there is also provided side recess 17 adapted to accept side plate 8c as shown in FIG. 50. Loading opening 11 is located inside the recess 17 to accept the rotating shaft 9.

Front cover 8 can be mounted on upper half 2 as shown in FIG. 49 by inserting side plate 8c into side recess 17 after hooking spring 12 on rotating shaft 9. Under such arrangement, however, rotating shaft 9 is not supported firmly because front section 2c of upper half 2 is only in contact with section 8b and free end 12c of front cover spring 17 in the vicinity of side plate 8c as shown in FIG. 46. Rotating shaft 9 can be positioned between upper half 2 and lower half 3.

As shown in FIG. 47, side wall 3c, which is substantially complementary to loading opening 11, is located at the front portion of the side wall of the lower half 3 corresponding positionally to loading opening 11.

Lower opening 18 is above side wall 3c and corresponds to the corner section of loading opening 11. Only when lower opening 18 and the corner portion of loading opening 11 are assembled, loading hole 19 can pivotally support rotating shaft 9.

Hence, when front cover 8 is just mounted on upper half 2, side plate 8c and its surrounding portions are caused by the force of front cover spring 12 to be in contact only with upper half 2, thus, rotating shaft 9 is neither positioned at the prescribed location nor supported because there are no members which restrict the its movement.

The correct positioning of the rotating shaft 9 is effected by the formation of loading hole 19 by the alignment between upper half 2 and lower half 3. The proper support of rotating shaft 9 is achieved when its bottom portion is supported by lower opening 18. After the foregoing, both halves 2 and 3 are fixed together by machine screws 20 so that cassette body 4 is formed. After cassette body 4 is formed, a locking mechanism operates so that front cover 8 is locked in its closed position.

As shown in FIGS. 46-48, front cover supporting member 15 is rotatably suspended at the corner portion of lower half 3 corresponding to front cover spring 12 when supporting pivots 15a and 15a, located at both sides of upper portion of supporting member 15 are supported by the upper portion of each of ribs 3a and 3a. Being urged by the force of spring 16 that is to be hooked on supporting pivot 15a on the other side, locking protrusion 15b and releasing protrusion 15c are provided at the bottom of supporting member 15 and extend out of side wall 3c and locking protrusion 15b is caught by front cover 8 which is kept in its closed position.

When the cassette is inserted into a VTR, the actuator on the VTR moves releasing protrusion 15c toward the inside of the cassette against the force of spring 16, as a result, locking protrusion 15b is also moved toward the inside of the cassette, which releases the engagement between locking protrusion 15b and the front cover 8.

Thereafter, an actuator on the VTR for opening and closing of the front cover enters guide groove 4b and moves the front cover 8 to its open position, against the force of front cover spring 12.

In the aforesaid system, however, the front cover occasionally comes off the upper half due to vibration or shock during the transportation of the upper half on which the front cover is mounted or during the assembly thereof. The front cover is not firmly mounted on the upper half which is not finally assembled and there is no means which prevents the rotating shaft on the front cover from moving toward the front side of the cassette and toward the lower half side. This causes the front cover spring to be lost and results in time-consuming re-attaching of the spring, thus adversely affecting the assembly.

The present invention has been devised with against the background mentioned above and its object is to provide a magnetic tape cassette wherein aforesaid problems have been solved by the final mounting of the front cover on the upper half before the upper half is fixed to the lower half. Further, the lower opening that serves as a supporting surface for the rotating shaft in the conventional cassette must have a degree of manufacturing accuracy because the rotating shaft in the loading hole requires its smooth rotation and an optimum play.

Object of the Invention

Therefore, it is an object of the invention to provide a magnetic tape cassette wherein the lower opening which forms the loading hole is easy to manufacture.

Furthermore, the conventional front cover spring pin requires two steps to give torsional force to the coil portion; one is to slip the coil portion of the spring on the rotating shaft and the other is rotation of the coil portion to hook the fixing end of the spring on the hook pin. Performance of these stops requires substantial dexterity on the part of the worker.

In addition to the above, the spring which keeps the front cover closed is peculiar in its shape and accordingly needs special manufacturing techniques. Therefore, the spring tends to be purchased from an outside supplier, which increases its cost.

An object of the invention, therefore, is to provide a spring that keeps the front cover of a magnetic tape cassette closed and is easy and inexpensive to manufacture.

DISCLOSURE OF THE INVENTION

In order to attain aforesaid objects, the present invention provides a magnetic tape cassette wherein a loading opening opened toward the lower half side is provided on the side wall located in the leading edge portion of the upper half. The rotating shaft of the front cover that covers the front portion of the cassette body is supported by a supporting means incorporated in the vicinity of the loading opening so that the rotating shaft can be opened and closed. The lower opening, that is opened toward the upper half, is provided on the lower half and both recessed openings form the loading hole, and the magnetic tape cassette is characterized in that the lower opening on the lower half is formed so that it does not contact the rotating shaft.

Furthermore, the invention is characterized in that a stopper protrusion that prevents the rotating shaft from slipping out in the direction of the lower half is provided at the loading opening on the upper half that supports the rotating shaft. Also, another stopper protrusion that prevents the rotating shaft from slipping out toward the front side of the cassette body is provided in the vicinity of the tip of the rotating shaft located on the internal surface of the upper half.

Moreover, the magnetic tape cassette of the present invention is characterized in that the front cover spring is a leaf spring and a spring portion is formed between the tip of the front cover spring which is supported by pressure of the upper half and its fixed end, which is supported on aforesaid rotating shaft.

BRIEF DESCRIPTION OF THE DRAWINGS

In the accompanying drawings, in which like reference characters indicate like parts, FIG. 1 is a rear view with a partial cutout of the magnetic tape cassette viewed from the lower half side;

FIG. 2 is a perspective view of the main portions with both halves fixed together;

FIG. 3 is a sectional perspective view of the portions shown in FIG. 2;

FIG. 4 a sectional rear view of the main portions of the upper half viewed from inside;

FIG. 5 is a cross-sectional view taken on line II—II in FIG. 1;

FIG. 6 is a view taken on line III—III in FIG. I;

FIG. 7 is a cross-sectional view of the main portions;

FIG. 8 is a perspective view showing a spring according to the invention;

FIG. 9 is a cross-sectional view showing the open and closed positions of the front cover;

FIG. 10 is an exploded view of a reel used in the present invention;

FIGS. 23-26 show an embodiment wherein the stopper protrusion is at the loading opening;

DETAILED DESCRIPTION OF THE INVENTION

Figure 1:
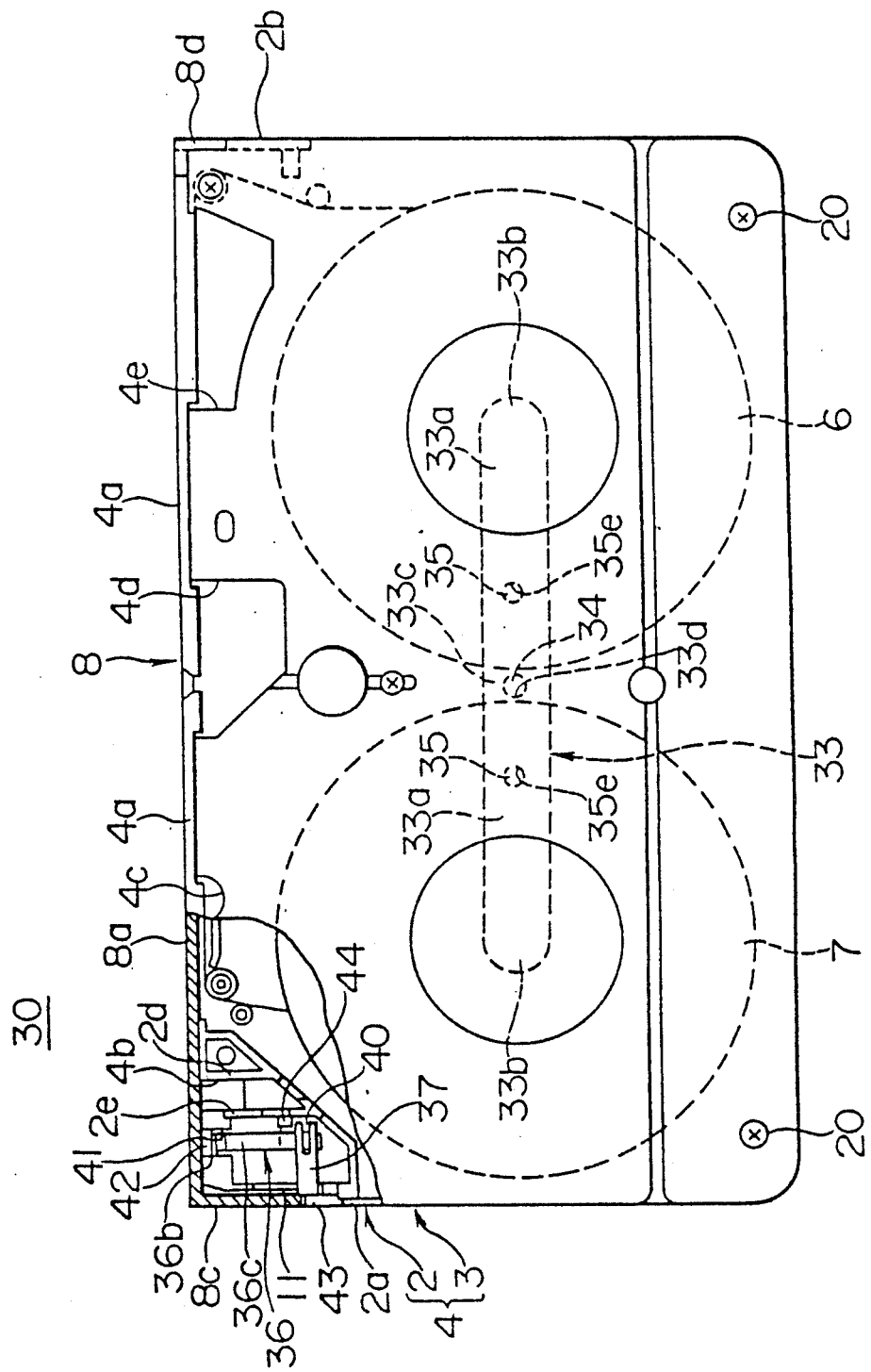
FIGS. 1-10 show the first embodiment of the invention.

FIGS. 1–10 show the first embodiment of the invention. As shown in FIG. 1, cassette body 4 of magnetic tape cassette 30 to be used in a household VTR is composed of upper half 2 and lower half 3. In the cassette body, there is provided supply reel 6 around which magnetic tape 5 is wound and take-up reel 7. At the front portion of cassette body 4 which is to be inserted in the VTR with the front portion facing the VTR, there is arranged front cover 8 that pivotally covers magnetic tape 5 which extends from both reels 6 and 7 and runs on the front side of tape guides 4a and 4a.

Figure 10:
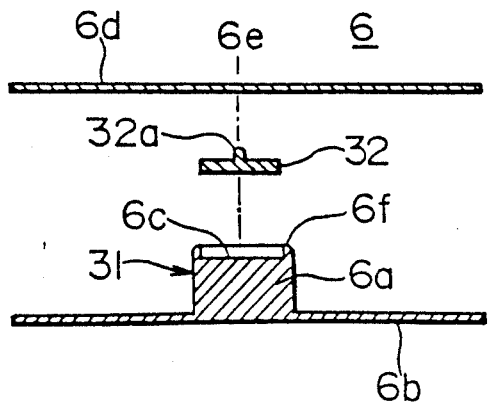

As shown in FIG. 10, reel body 31 of supply reel 6 is formed so that lower flange 6b is spread below reel hub 6a around which magnetic tape 5 is wound. In the recessed portion 6c on reel hub 6a, there is provided piece 32 equipped with protrusion 32a fitted in hole 6e on upper flange 6d. Upper flange 6d is fixed by, for example. supersonic welding to protruded edge 6f around recessed portion 6c. Take-up reel 7 on the other side is formed similarly.

Further, as shown in FIG. 1, at the center on the inside surface of upper half 2, reel-holding spring 33 urges both reels 6 and 7 toward the side of lower half 3 in the longitudinal direction of cassette body 4.

Spring 33 is a narrow strip with both ends rounded in semicircular form and has reel-holding portions 33b and 33b at the tips of wings 33a and 33a bending toward the side of reels 6 and 7. Spring 33 is fixed and supported with its fixing hole 33d of fixing portion 33c at the center thereof which engages protrusion 34 on upper half 2. As a whirl-stop device for the spring 33, engaging holes 33e and 33e on the base portion of wings 33a and 33a contact the inside surface of upper half 2 and engage protrusions 35 and 35 on upper half 2.

On the front side of cassette body 4, there are provided in a recessed manner guide groove 4b in which an actuator of the VTR for opening front cover 8 is to be inserted, cutout 4c in which a pinch roller is to be positioned, and cutouts 4d and 4e in which a loading mechanism is to be positioned. Tape guide portions 4a and 4a are formed between cutout 4c and cutout 4d and between cutout 4d and cutout 4e, respectively.

Figure 2:
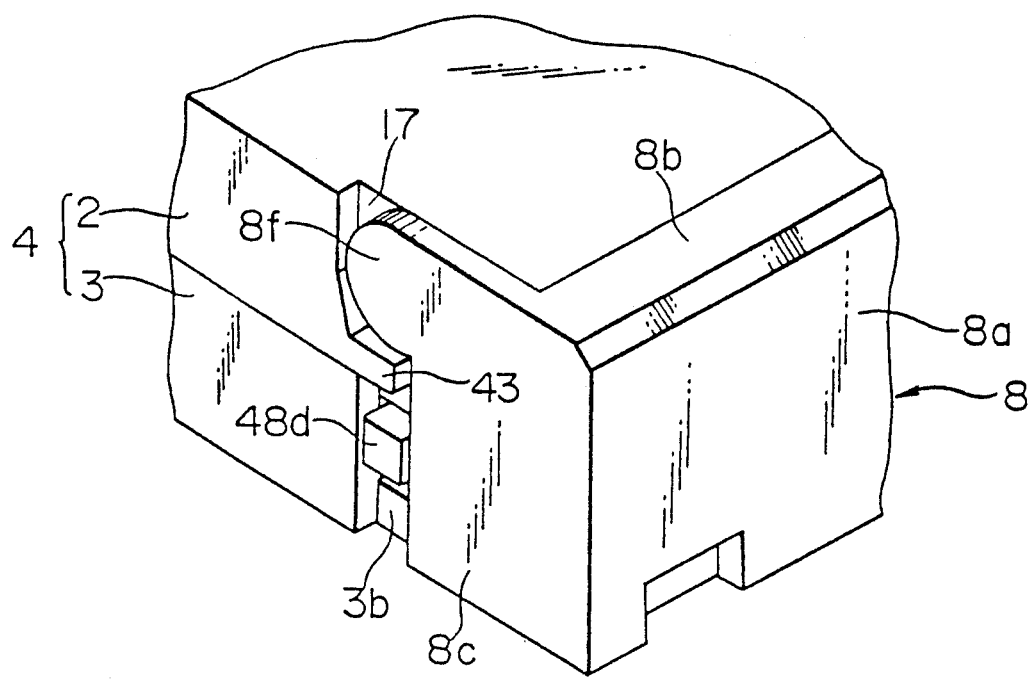
Figure 3:
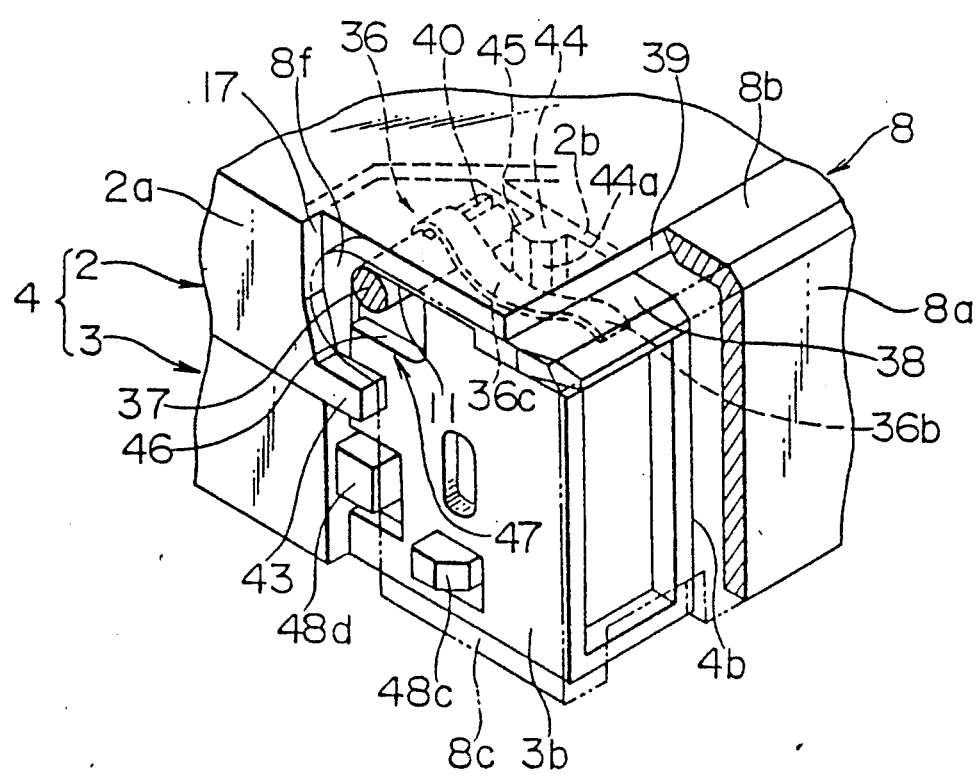

Front cover 8 has side plates 8c and 8d at both ends of front plate 8a. Top plate 8b is formed in a flat U-shape and axis-keeping member 8f, having in a circular arc form, is at the upper corner of side plate 8c on one side, as shown in FIGS. 2 and 3. Rotating shaft 37, on which front cover spring 36 is hooked, is provided inside of axis-keeping member 8f.

Figure 6:
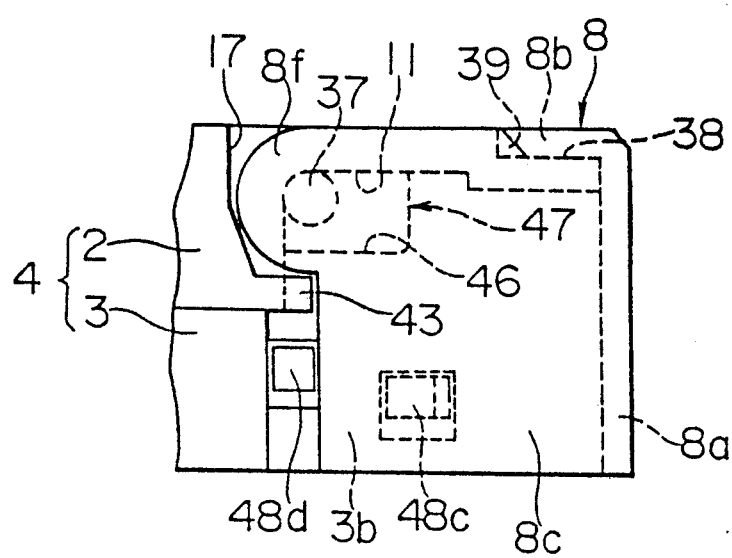

Further, when front cover 8 is mounted on upper half 2, stepped portion 38 at the top surface of the front of upper half 2 accepts top plate 8b and forms perpendicularly corner portion 39 which faces the edge portion of top plate 8b which is cut slantingly toward the inside as shown in FIG. 6.

Fixed end 36a, tip 36b and spring portion 36c in a loop shape between ends 36a and 36b of, front cover spring 36, are preferably a leaf spring.

Spring 36 is attached so that spring portion 36c faces lower half 3 and fixed end 36a is inserted into slit 40 axially formed at the tip portion of rotating shaft 37 so that the spring surrounds approximately one half of circumference of the rotating shaft 37. Tip 36b, at the free end engaged loosely with guide groove 41 on upper half 2, touches stopper protrusion 42.

Figure 4:
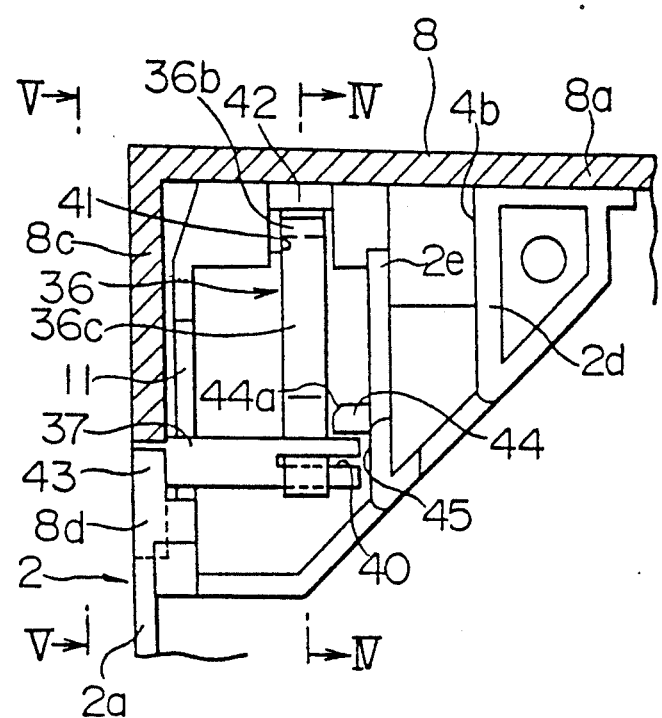

As shown in FIG. 3, side recess 17 for accepting the axis-keeping member 8f of front cover 8 is provided on side plate 2a of upper half 2 and holding protrusion 43 is on the lower half side in the side recess. Among partition walls 2d and 2e of the upper half 2, both forming front cover opening guide groove 4b as shown in FIG. 4, partition wall 2e has stopper protrusion 44 thereon having, at the front side of its tip, chamfered portion 44a in the vicinity of the tip of rotating shaft 37 so that stopper protrusion faces loading opening 11.

When assembling the cassette, front cover 8 is attached first to upper half 2 and then lower half 3 is attached to upper half 2.

When attaching front cover 8 to upper half 2, the shorter rotating shaft on side plate 8d of front cover 8 is inserted first and supported in the through hole provided on the front side of side wall 2b of upper half 2. Then, side plate 8c, having thereon longer rotating shaft 37, is positioned in side recess 17 on side wall 2a of upper half 2.

In this case, the tip of rotating shaft 37 engages stepped portion 45 having stopper protrusion 44, partition wall 2e, being guided by chamfered portion 44a of stopper protrusion 44. When the tip of rotating shaft 37 is advanced, it is guided by chamfered portion 44a and is moved toward the loading opening by the elastic deformation of the front cover. After the tip engages stepped portion 45, the deformation of the front cover disappears and the movement of rotating shaft 37 toward its front is blocked by stepped portion 45 located behind stopper protrusion 44. At the same time, axis-keeping member 8f is guided by holding protrusion 43, into side recess 17 and the base portion of rotating shaft 37 is supported at the corner of loading opening 11 by the pressure of front cover spring 36.

Thus, the movement of rotating shaft 37 toward its front from the corner of loading opening 11 is blocked by stopper protrusion 44 and the movement of rotating pivot 31 toward the lower half from loading opening 11 is blocked by holding protrusion 43. As is clear from FIG. 6, it is possible to locate and rotatably mount rotating shaft 37 in large loading hole 47 formed by the combination of, loading opening 11 and lower opening 46 formed by cutting off the upper corner section of lower half 3 on a large scale. Movements of rotation-supporting portion 8d and rotating shaft 37 of front cover 8 are blocked by holding protrusion 43 and by stopper protrusion 44, respectively, and rotating shaft 37 is pressed to the corner of loading opening Il by front Cover spring 36. Therefore, rotating shaft 37 does not touch, even when it swings, lower opening 46 of lower half 3.

In the present embodiment, as stated above, rotating shaft 37 of front cover 8 is pressed and urged toward the corner of loading opening 11 by front cover spring 36, holding protrusion 43, and stopper protrusion 44; i.e., rotating shaft 37 is set at the prescribed axial position and front cover 8 may be attached finally merely by mounting front cover 8 on upper half 2. In other words, the front cover may be set at the prescribed position without alignment between upper half 2 and lower half 3.

Therefore, during the period of transportation in the assembly line or of assembly work on front cover 8 assembled with upper half 2, vibration or shock does not cause the front cover to come off easily, since the front cover is firmly attached to upper half 2, also, front cover spring 36 is not easily lost, both of which improve the efficiency of assembly. Further, front cover 8 does not easily come off while it is opened or closed even without the lower half attached, because it is attached firmly to upper half 2.

Further, when joining upper half 2 and lower half 3, the positioning of rotating shaft 37 has already been established and front cover 8 is swingable. Therefore, the method of assembling upper half 2 and lower half 3 together is not in any way restricted by the state of front cover 8.

Hence, the front cover may be in either its closed or opened position, or even in inbetween. Therefore, it is possible to swing front cover 8 to the position that makes it easiest to assemble upper half 2 and lower half 3, which further improves the efficiency of the assembly. Moreover, after assembling upper half 2 and lower half 3, the bottom of rotating shaft 37 does not need to be supported by lower opening 46 of lower half 3. Therefore, the dimensional accuracy of lower opening 46 that has previously been required for positioning the rotating shaft is not needed, which increases the ease of manufacture.

As stated above, upper half 2 and lower half 3 are assembled to form cassette body 4 after front cover 8 has been firmly attached to upper half 2. The manner of locking front cover 8 after cassette body 8 has been formed will be explained as follows.

Figure 5:
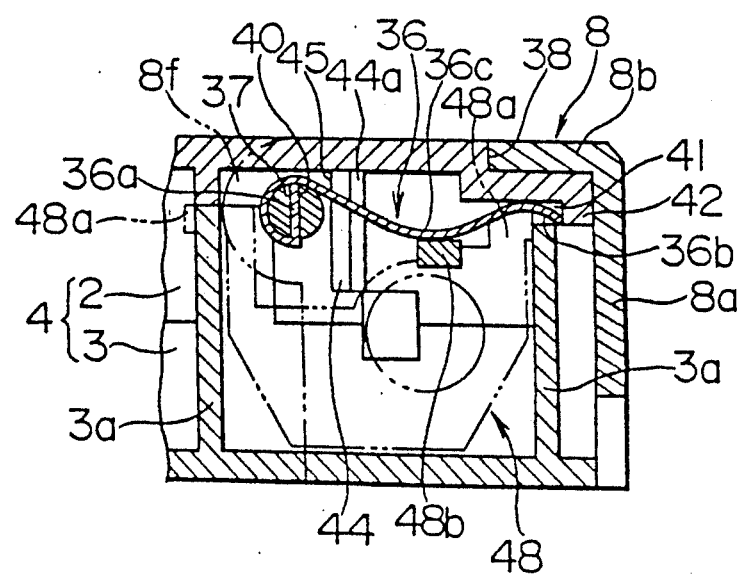
Figure 7:
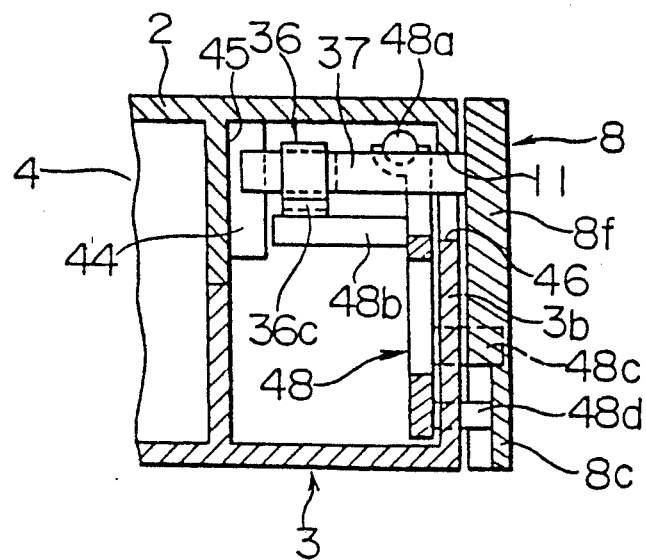
Figure 8:
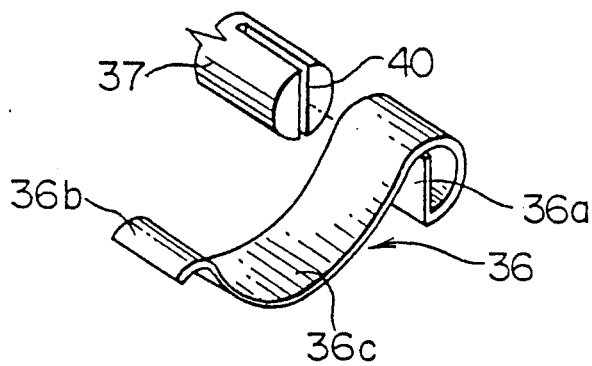

As shown in FIG. 5, front cover locking means 48 is rotatably supported at the corner of lower half 3 opposite to the fixing position for spring 36 with pivots 48a and 48a located at both sides at the top thereof and supported by the upper parts of ribs 3a and 3a of lower half 3. As shown in FIG. 7, locking member 48 is equipped with protrusion 48b for rotation caused by spring portion 36c of front cover spring 36, locking protrusion 48c, and releasing protrusion 48d. Front cover 8 engages locking protrusion 48c. Thus the front cover is kept closed. When the cassette is inserted into a VTR, an actuator claw of the VTR push releasing protrusion so as to release locking protrusion 48c from engagement with the front cover.

Figure 9:
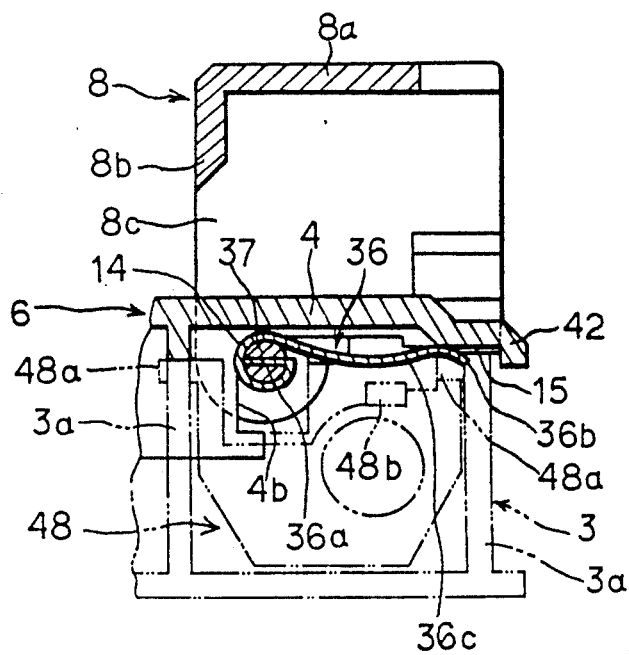

When magnetic tape cassette 1 is loaded in to the VTR and front cover 8 is opened as shown in FIG. 9, rotating shaft 37 to which front cover spring 36 is attached rotates counterclockwise, front cover spring 36 is wound around rotating shaft 37, tip 36b leaves stopper protrusion 42 and the loop shape of spring portion 36c moves upwards slightly and leaves protrusion 48b of front cover locking means 48.

Further, when magnetic tape cassette I is taken out of the VTR, rotating shaft 37 is rotated clockwise by the restoring force of spring portion 36c of front cover spring 36 which swells downward and tip 36b of spring 36 extends as shown FIG. 5. Thus spring portion 36c moves protrusion 48b of front cover holding means 48 and front cover 8 is forced into its closed position. As stated above, front cover spring 36 exerts two force, i.e., for rotating rotating shaft 37 and for moving front cover holding means 48.

Figure 46:
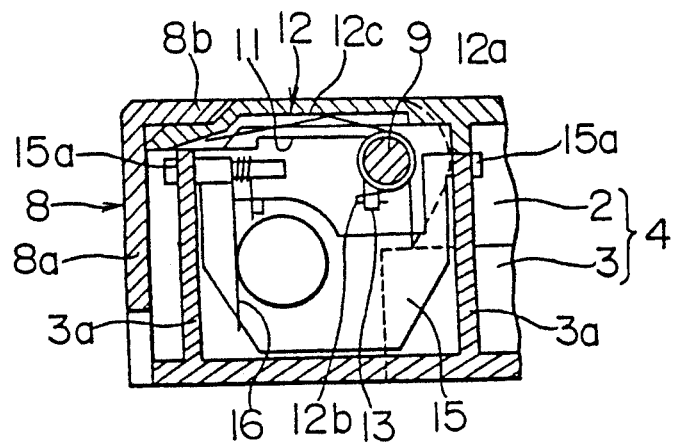
FIG. 46 is a cross-sectional view taken on line X—X of FIG. 45.
Figure 47:
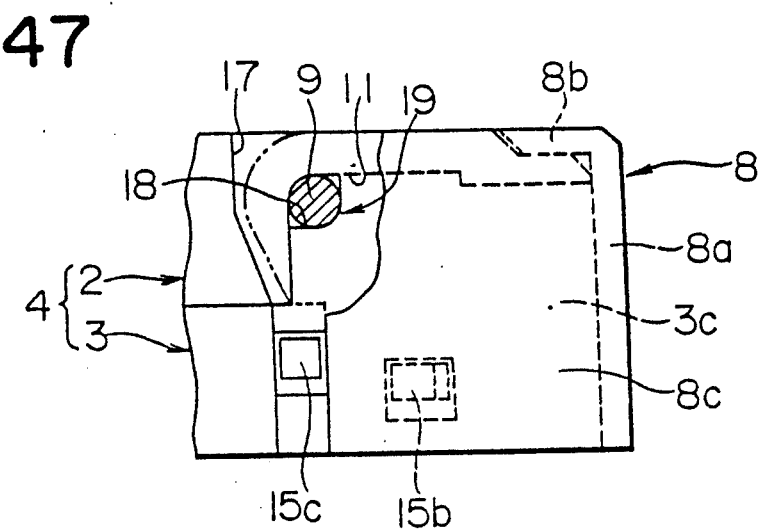
FIG. 47 is a view with a partial cutout taken on line XI 13 XI in FIG. 45.
Figure 48:
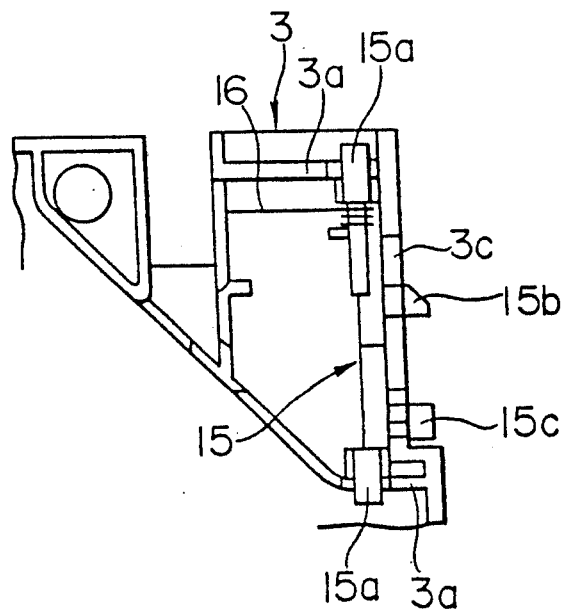
FIG. 48 is a top view of a corner portion of the lower half which corresponds to the recess at the top on left side of FIG. 45 and is viewed from the upper half side.
Figure 49:
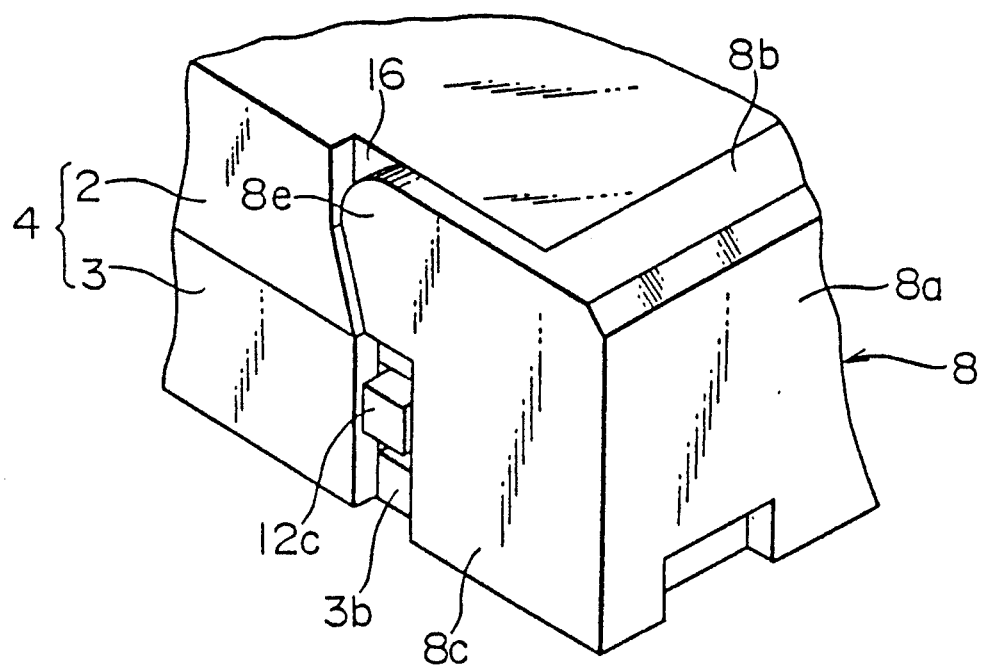
FIG. 49 is a perspective view of the main portions of the conventional upper half and lower half both of which are fixed together.
Figure 50:
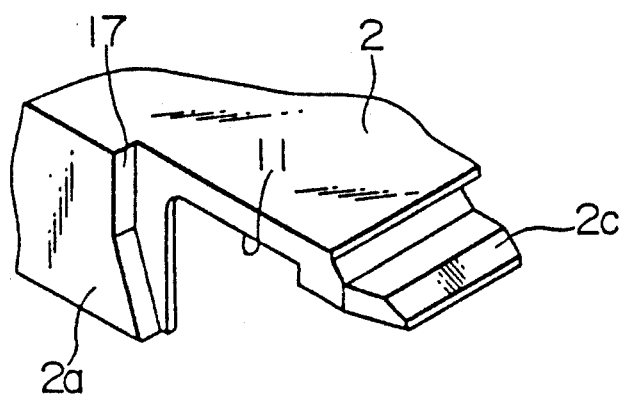
FIG. 50 is a perspective view showing the loading opening of the conventional cassette.

In the conventional cassette as shown FIG. 46, both front cover spring 12 for rotating and spring 16 for moving the front cover holding means are used. However, in the present invention, only one spring is needed because the spring portion is formed in a loop exerting force in two directions, including the rotating direction of the rotating shaft and the vertical direction perpendicular to the rotating direction. This contributes to cost reduction owing to the reduced number of parts and to the improvement of the degree of freedom in designing with broader layout space. Further, it is possible to make the spring merely by cutting a leaf spring to the desired length and bending it, which leads to easier, and hence lower cost of manufacture.

Incidentally, the spring of the invention is not limited to the form shown; the shapes of the various portions of the spring may be varied as in known to persons of ordinary skill in the art. Further, applications in a wide range in addition to the specific disclosures are possible.

In the first embodiment, it is stated that tip 36b of front cover spring 36 touches stopper protrusion 42 as shown in FIG. 5. Front spring 36 and stopper protrusion 42, therefore, will be explained in detail as follows.

Figure 35:
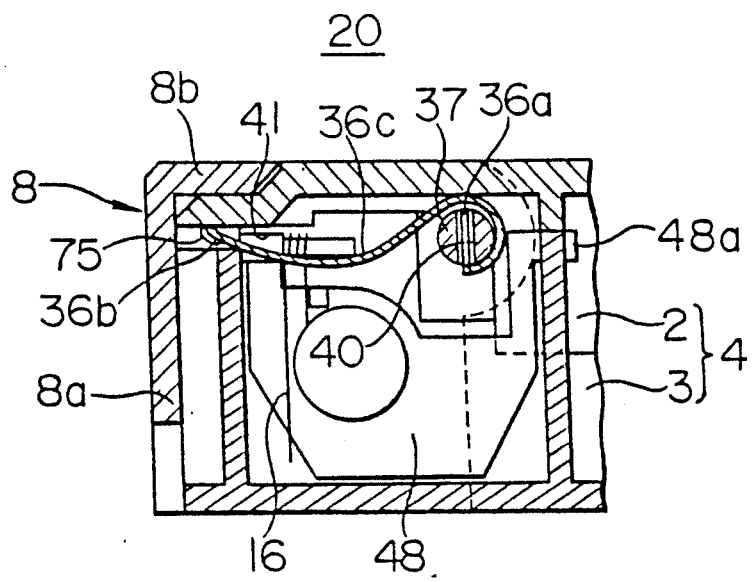

When holding protrusion 43 and stopper protrusion 44 are provided as shown for the attachment of front cover 8, it is not necessary to provide stopper protrusion 42 which blocks the movement of tip 36b of front cover spring 36 toward the front; the structure can be the one shown in FIG. 35, for example.

Front cover spring 36 alone can produce the force for rotating rotating shaft 37 and the moving force for the front cover locking means.

Therefore, it is not necessary to provide stopper protrusion 34 for attachment of front cover 8, locking it in its closed position, or permitting swinging thereof. However, when stopper protrusion 42 is provided as shown in FIG. 5, the reaction force produced by tip 36b of front cover spring 36 touching stopper protrusion 42 is effectively utilized reinforce the force of front cover spring 36. Nonetheless, stopper protrusion 42 can be provided to assist in the final attachment of front cover 8.

For movement of front cover 8 toward its front, the axial position of rotating shaft 37 can be kept at the prescribed position by adjusting tip 36c of front cover spring 36 by stopper protrusion 42. Therefore, it is not necessary, to provide stopper protrusion 44 because the attachment in this case is effected by holding protrusion 43 and stopper protrusion 42.

Further, from the preliminary attachment viewpoint, holding protrusion 43 does not need to be provided. If holding protrusion 43 is not provided, the movement of rotating shaft 37 toward lower half 3 is blocked only by the pressing force of front cover spring 36 in the direction of the corner, and front cover 8 neither comes off vertically because the front portion of the top plate of the front cover is caused to contact upper half 2 by front cover spring 36, nor comes off forward by because the movement of front cover 8 to its front is blocked by stopper protrusion 42 as stated above. Therefore, it is possible to prevent front cover 8 from coming off only by providing stopper protrusion 42.

It is possible to prevent the front cover 8 from coming off even if both stopper protrusion 42 and holding protrusion 43 are not provided, merely by the use of stopper protrusion 44.

In FIGS. 11-14, a conventional coil spring is employed. In upper half 2, holding protrusion 43 is provided on the lower half side in side recess 17 in the same manner as in the first embodiment. Stopper protrusion 44, having chamfered portion 44a, is provided on partition wall 2e while, in lower half 3, there is lower opening 46 formed by cutting off the upper corner portion at the side of upper half 2 on a large scale.

Front cover 8 is mounted so that the tip of rotating pivot 9 guided by chamfered portion 44a of stopper protrusion 44 is inserted in stepped portion 45 formed by stopper protrusion 44 and partition wall 2e. The base portion of rotating pivot 9 is pressed toward and locked to the corner of loading opening 11 by the force of front cover spring 12, and axis-keeping member 8f is positioned in side recess 17 located at the top of holding protrusion 43. Thus, rotating pivot 9 does not touch lower opening 46 of lower half 3. Hences, the final attachment structure can attain its object without being limited to any particular kinds of springs.

Now, the spring and the structure for final attachment will be explained. Each of front cover spring 36 that is a leaf spring (see FIG. 5) and front cover spring 12 that is a coil spring (see FIG. 12) presses the rotating shaft toward the corner of the loading opening and, in this case, holding protrusion 43 and stopper protrusion 44 need only be a position regulating member that can prevent the pressed rotating shaft from moving more than a prescribed distance.

In the final attachment, the movement that is greater than the prescribed distance is blocked, the rotating shaft is again pressed toward the corner of the loading opening by the force of the front cover spring.

It is also possible to use a front cover spring for the swing in the present invention without pressing the rotating shaft to the corner of the loading opening.

In this case, the device may be the one wherein holding protrusion 43 and stopper protrusion 44 are the axis-keeping member that holds the rotating shaft at the prescribed position.

In the first embodiment shown in FIGS. 1-10, the movement of front cover 8 toward the lower half is blocked by holding protrusion 43 wherein axis-keeping member 8f for front cover 8 is provided on upper half 2. However, the position of holding protrusion 43 is not limited to the one illustrated.

Figure 15:
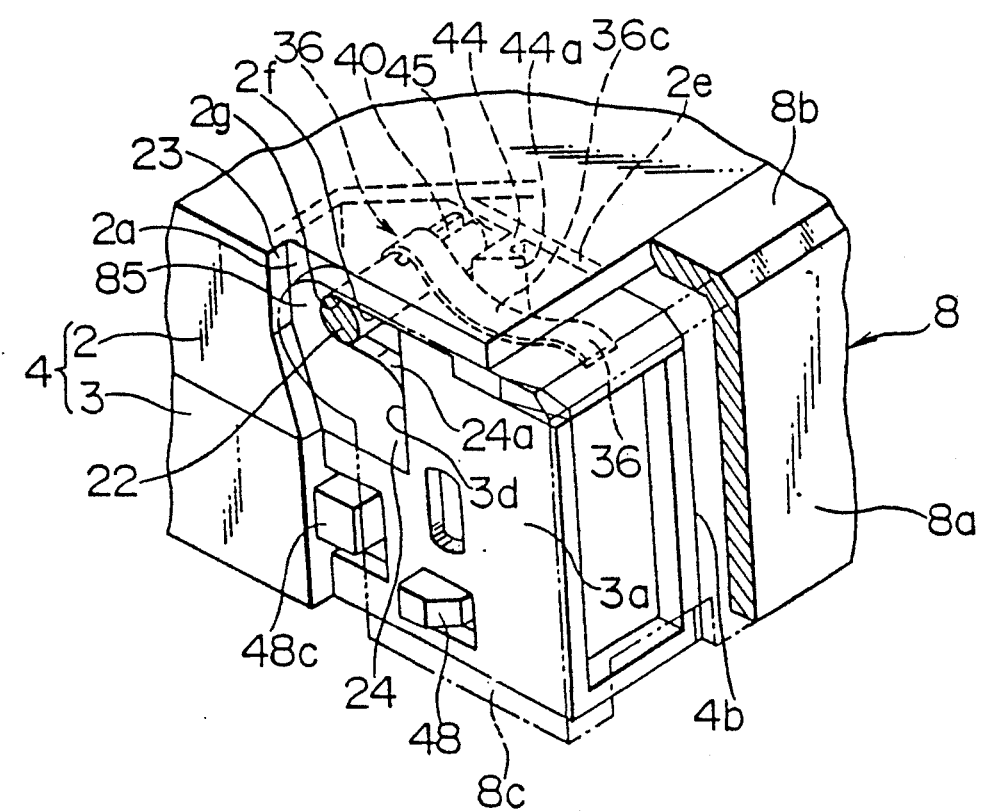
FIGS. 15-17 show another form of supporting protrusion.

As shown in FIG. 15, there is formed cutout 23 for arranging side plate 8c of front cover 8 and axis-keeping member 8f thereof aligned on the same plane on one side wall at the front of cassette body 4 that is on the side of rotating shaft 37. Side plate 8c and axis-keeping member 8f both of front cover 8 are attached outside of front side walls 2a and 3a of both halves 2 and 3 which form cutout 23.

On front side wall 2a, holding protrusion 24 extends toward the front side of cassette body 4 so that the space to accept rotating shaft 37 on a loose fit basis is formed below inside corner 2g of loading opening 2f. On front side wall 3a of lower half 3 which forms cutout 23 together with front side wall 2a of upper half 2, there is formed lower opening 3d which engages with holding protrusion 24.

Further, on the side of loading opening 2f of partition wall 2e among partition walls 2d and 2c of upper half 2 which form guide groove 4b for the movement of the front cover, there is provided rib-shaped stopper protrusion 44 on the front side of cassette body 4 located close to the tip of rotating shaft 37 on front cover 8 which is to be engaged with inside corner 2g.

Holding protrusion 24 on one side supports the base portion of rotating shaft 37 on front cover 8 which engages, on a loose fit basis, inside corner 2g of the upper half 2 and prevents rotating shaft 37 from moving away toward lower half 3. Stopper protrusion 44 on the other side engages the tip of rotating shaft 37 and prevents it from moving away toward the front side of cassette body 4. Thus, front cover 8 is mounted permanently on upper half 2 by holding protrusion 24 and stopper protrusion 44.

Figure 16:
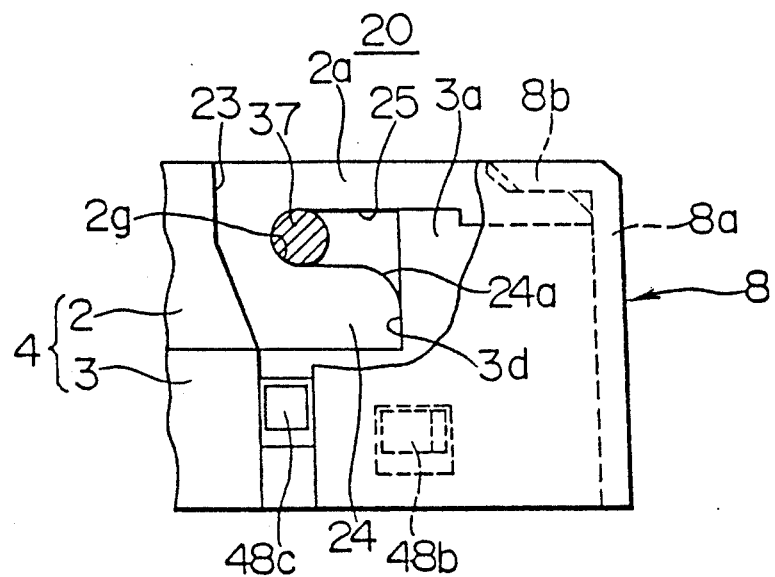
Figure 17:
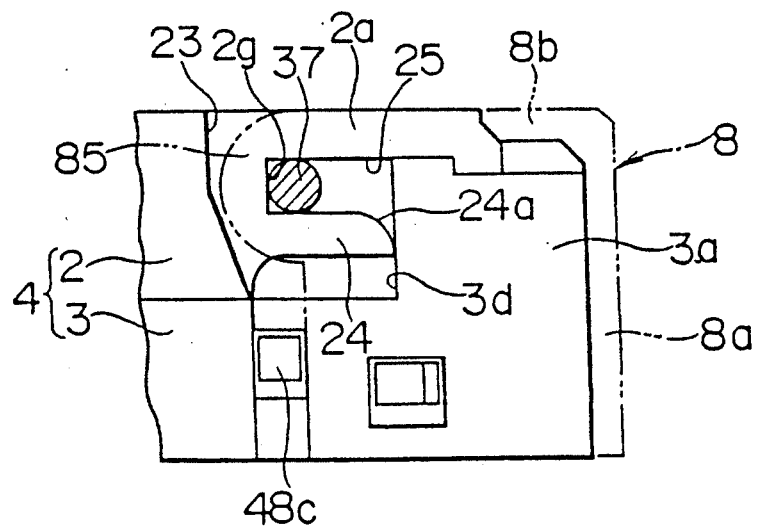

The bottom surface of holding protrusion 24 may be a wide form that is substantially aligned which the mating surface between both halves 2 and 3 as shown in FIGS. 15 and 16, as shown in FIG. 17. Alternatively, it may be a narrow form separated from the mating surface with its lower corner portion of the base part rounded for higher strength, and inside corner 2g may either be a semicircle complementary to the periphery of rotating shaft 37, as shown in FIGS. 15 and 16, or be a square as shown in FIG. 17.

At the front corner of holding protrusion 24, there is provided chamfered portion 24a in a circular arc form which simplifies the insertion of rotating shaft 37. On stopper protrusion 44, there is provided slanted guide surface 44a which guides the insertion of the tip of the rotating shaft 37.

When mounting front cover 8 on upper half 2, the rotating pivot on front cover 8 is supported on upper half 2 and rotating shaft 37 is inserted from the front side of upper half 2 while pressing front cover 8 toward the side of rotating shaft 37.

Rotating shaft 37 advances, with its base portion being guided by chamfered portion on 24a of holding protrusion 24, through the clearance between holding protrusion 24 and loading opening 2f, further advances, with its tip sliding on guide face 44a of stopper protrusion 44, and, the base portion of rotating shaft 37 falls in inside corner 2g of loading opening 2f. The tip thereof falls in stepped portion 45 of stopper protrusion 44, thus, rotating shaft 37 is positioned at its prescribed location.

After rotating shaft 37 is positioned, the tip of front cover spring 36 attached to rotating shaft 37 is engaged with guide groove 41 on upper half 2 and spring portion 36c thereof produces a spring force against upper half 2 which presses toward inside corner 2g of rotating shaft 37.

Rotating shaft 37 positioned at inside corner 2g of upper half 2 is prevented by holding protrusion 24 from moving away downwardly and is prevented by stopper protrusion 44 from moving away toward the front side. Therefore, rotating shaft 37 is firmly positioned without be able to move away in any direction. Thus, front cover 8 is mounted on upper half 2.

Figure 11:
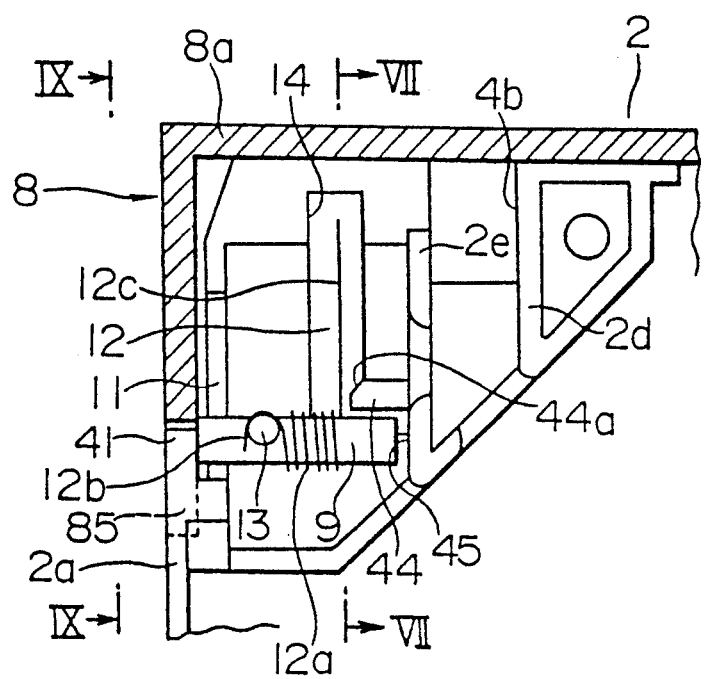
FIGS. 11-14 show an embodiment wherein a coil spring is used in the embodiment of FIG. 1.
Figure 12:
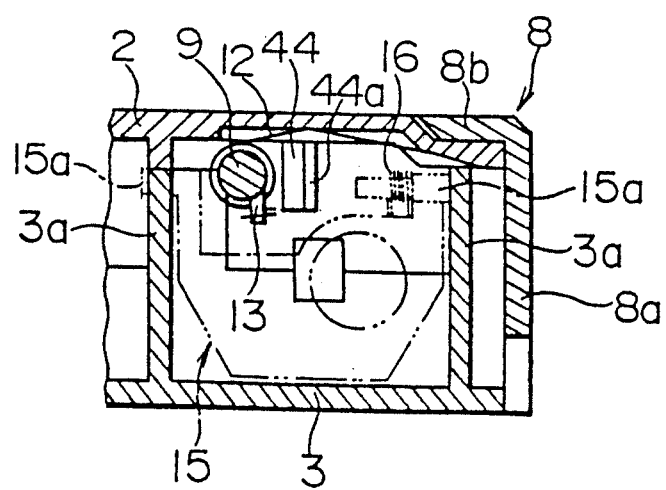
Figure 13:
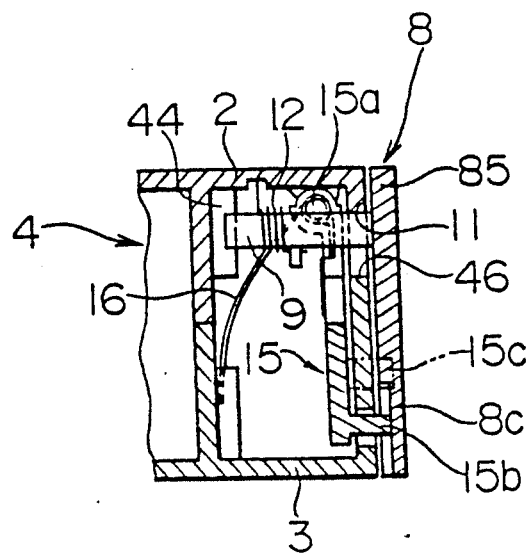
Figure 14:
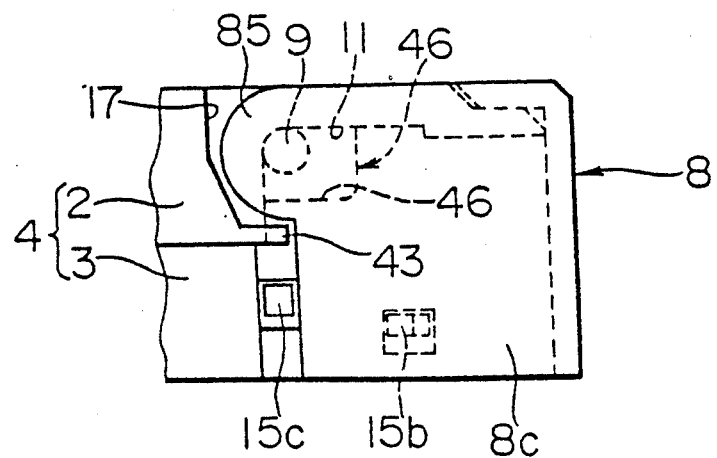
Figure 18:
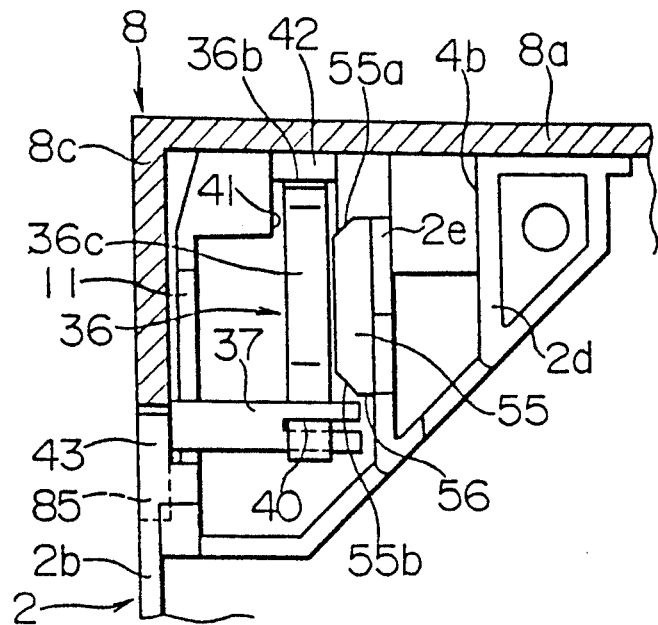
FIGS. 18-19 show another form of stopper protrusion.

The stopper protrusion 44 is not limited to shown in FIGS. 114 11. FIG. 18 shows the variety of stopper protrusions which may be used. At the side of loading opening 11 on partition wall 2e forming guide groove 4b and located at the side of rotating shaft 37 on upper half 2, there is provided stopper protruded edge 55 having, at its front side, slanted portion 55a that guides rotating shaft 37, along the free end of front cover spring 36. At the rear of stopper protruded edge 55, there is formed, on stepped portion 56, slanted portion 55b which guides rotating shaft 37 for attachment.

The tip of rotating shaft 37 supported at loading opening 11 is blocked by stepped portion 56 formed by the stopper protruded edge 55 and partition wall 2e. One side of the free end of front cover spring 36 is extended or contracted depending on opening or closing of front cover 8 and is guided without substantial play by stopper protruded edge 55.

Figure 19:
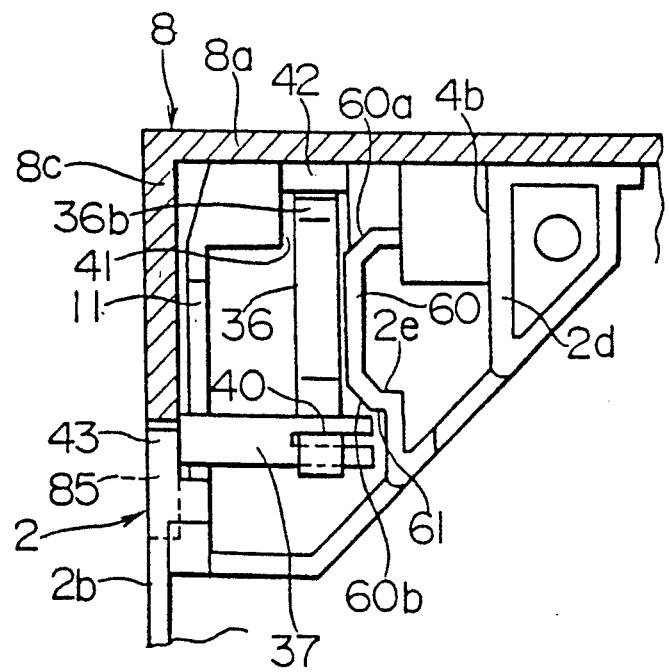

FIG. 19 shows another stopper protrusion. On partition wall 2e at the rotating shaft 37 side, there is provided, along the free end of front cover spring 36, stopper protruded edge 60 that extends toward loading opening 11. The tip of rotating shaft 37 is locked by stepped portion 61 formed by both protruded edge 60 and partition wall 2e. Chamfered portion 60a and chamfered portion 60b that are a guides for loading are formed at the front edge side and at the side of stepped portion 61 of stopper protruded edge 60, respectively.

FIG. 19 can guide, similarly to FIG. 18, the stopper of rotating shaft 37 and front cover spring 36 that is extended or contracted depending on opening or closing of front cover 8. It can also prevent play and, at the same time, a wall can be formed which is thinner than that shown in FIG. 18 and the lighter weight is attained because stopper protruded edge 60 is provided utilizing partition wall 2e.

Figure 20:
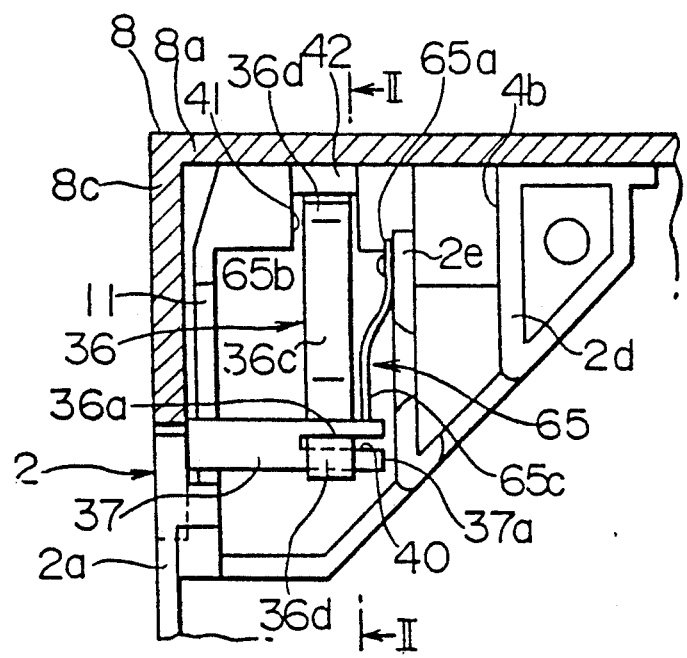
FIGS. 20-22 show an embodiment wherein an elastic member is use the stopper protrusion.
Figure 21:
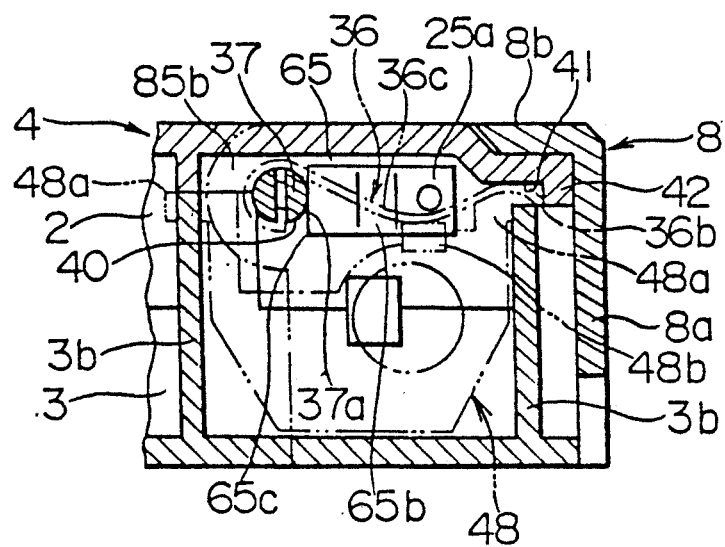

An example wherein an elastic member is used as a stopper protrusion will be stated next. As shown in FIGS. 20 and 21, partition wall 2e at the rotating shaft 37 side has elastic supporting member 65 comprising a leaf spring at the side of loading opening 11.

Elastic supporting member 65 prevents rotating shaft 37 of front cover 8 from moving away and for guiding the movement in opening and closing of the front cover. It is fixed with its base end 65a screwed down on partition wall 2e and bent portion 65b is formed in the vicinity of base end 65a. The tip thereof is parallel to front cover spring 36 and tip 65c touches or is close to the periphery of the tip of rotating shaft 37. When mounting the upper half, rotating shaft 37 is inserted in loading opening 11 and advances with end 37a contacting bent portion 65b of elastic supporting member 65. This pushes back the tip side of elastic supporting member 65, thus, when rotating shaft 37 reaches at the corner of loading opening 11, elastic supporting member 65 is released from the pressure of rotating shaft 37 and is returned to its original position by its resilience. This prevents rotating shaft 37 from moving away through the guide of tip 65c.

When rotating shaft 37 of front cover 8 is inserted in loading opening 11 of upper half 2, elastic supporting member 65 allows, by its elasticity, an advance of the rotating shaft. Therefore, front cover 8 can be inserted without the necessity of using any excessive force and rotating shaft 37, inserted in the corner of the loading opening, is prevented from moving away by tip 65c of elastic supporting member 65. Thus, front cover 8 can be mounted firmly on upper half 2 without coming off.

Furthermore, it is possible to prevent both the play of front cover spring 36 and its coming off caused by the play because of the smooth pivoting of rotating shaft 37 attained by guiding tip 36c of front cover spring 36 by guide portion 41 and by the arrangement of the tip side of elastic supporting member 65 provided parallel to one side of the free end of front cover spring 36.

Figure 22:
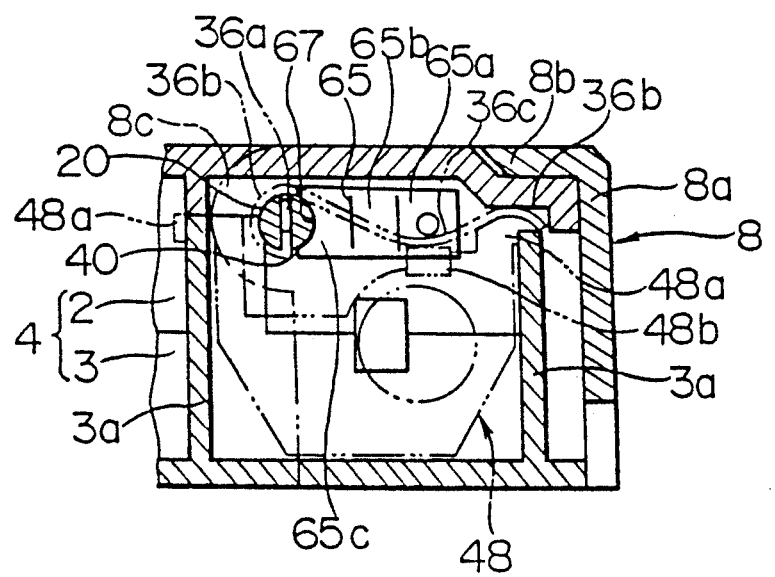
Figure 23:
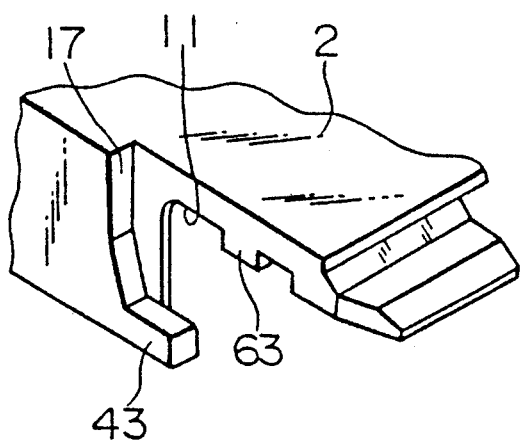
Figure 26:
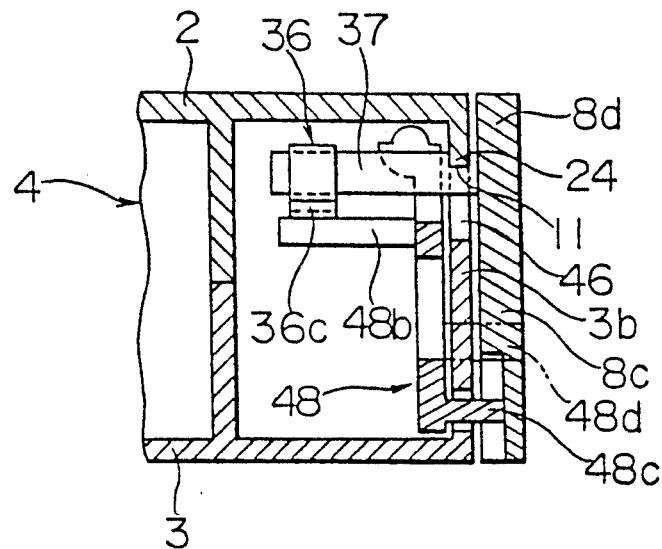

FIG. 22 shows an embodiment wherein supporting portion 67 in a shape of a circular arc having substantially the same diameter as the external periphery of the rotating shaft 37 is formed, on tip 65c of elastic supporting member 65, thereby supporting portion 67 supports rotating shaft 37; thus, the play of rotating shaft 37 is minimized and firm blocking of axial movement and a firm guide for rotation of rotating shaft 37 ar attained.

Incidentally, the elastic supporting member is fixed on the partition wall of the guide groove in this embodiment, but the present invention is not limited to this and the elastic supporting member may be fixed directly on the inside surface of the upper half. Further, besides a leaf spring, a bar type spring may also form the elastic supporting member.

Stopper mechanisms shown in FIGS. 18-21 may be applied to many devices wherein the front cover spring in a leaf or coil form and the front cover holding member spring are combined in many ways, and they block the axial movement of the rotating shaft and prevent play during rotation of the front cover spring.

Further, the stopper protrusions or the slanted or chamfered portions of the protruded edges shown in FIGS. 18-19 do not necessarily need to be formed at the side of a step that locks the rotating shaft. Further, slanted or chamfered portions 44a, 55a and 60a formed on the side to which the rotating shaft advances can be omitted.

Incidentally, the protrusions or protruded edges which serve as stoppers for axial movement of the rotating shaft are formed by the use of a magnetic tape cassette of a VHS type having a guide groove for the front cover opening in which an actuator of a VTR is inserted and utilizing the partition wall of the upper half which forms the guide groove. However, the protrusions or protruded edges of the invention may be provided directly on the upper half or on the lower half, therefore, they may be applied even to a VTR of a β type having no guide groove mentioned above.

The stopper protrusions disclosed so far are the ones which utilize partition wall 2e of upper half 2 forming guide groove 4b, but the invention is not limited to this and it is only necessary that the horizontal displacement between upper half 2 and front cover 8 be controlled.

As shown in FIGS. 23-26, for example, a stopper protrusion may be provided at loading opening 11 of upper half 2. When axis-keeping member 8f of front cover 8 is mounted in side recess 17, rotating shaft 37 is pressed by the force of front cover spring 36 toward the corner of loading opening 11. The movement toward the front of rotating shaft 37 thereafter is blocked by stopper protrusion 63 at loading opening 11.

Thus, it is possible to attain an effect that is the same as that of the stopper protrusion wherein partition wall 2e of upper half 2 is utilized. Therefore, it is not necessary to provide the stopper protrusion on partition wall 2e in the vicinity of the tip of rotating shaft 37 as shown in FIG. 24.

Figure 27:
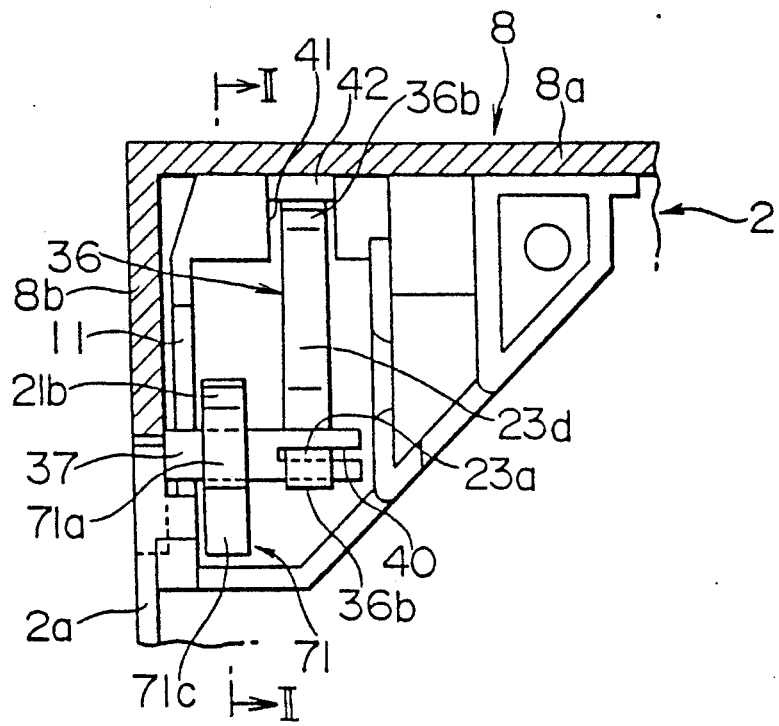
FIGS. 27-28 show the use of a rotating shaft supporting member.
Figure 28:
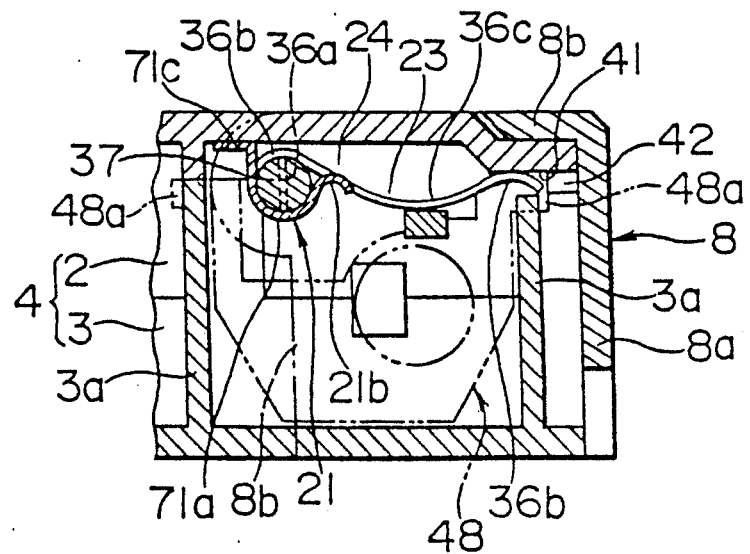

As examples for a final assembly, the devices employing the holding protrusion that restricts vertical movement or the stopper protrusion that restricts horizontal movement have been disclosed above, but the final assembly of the invention is not limited thereto. Namely, a second embodiment is shown in FIGS. 27 and 28.

The base portion of rotating shaft 37 on one side mounted at loading opening 11 is supported pivotally at shaft-supporting member 71 fixed on the internal surface of upper half 2 and front cover spring 36 is inserted in slit 40 formed in an axial direction at the front side of rotating shaft 37.

Shaft-supporting member 71 and front cover spring 36 are formed by bending the leaf spring which is cut to the required length. In shaft-supporting member 71, edge 71b, which guides the entrance of rotating shaft 37, is formed at one end of holding portion 71a which is mostly in a circular arc shape, and fixing member 71c is formed at the other end. Thus edge 71b faces the front side of upper half 2 and fixing member 71c is mounted on upper half 2 by affixing it in the vicinity of loading opening 11.

When the base portion of rotating shaft 20 engages loading opening 11 of upper half 2 when the front cover 8 is mounted and pressed backward, rotating shaft 37 enters through insertion entrance 74 between edge 71b of shaft-keeping member 71 and the inside surface of upper half 2 and then supported pivotally by holding portion 71a meanwhile tip 36 of the free end of front cover spring 36 that is to be engaged loosely with guide groove 41, touches stopper protrusion 42 and is supported by pressure toward upper half 2; thus, front cover 8 is mounted on upper half 2.

Therefore, the base portion side of rotating shaft 37 of front cover 8 that is to be positioned at loading opening 11 of upper half 2 is pivotally supported by shaft-holding member 71. Hence, there is no fear that the rotating shaft would come off even when front cover 8 is mounted on upper half 2. Thus, it is firmly held and reassembling is not needed, which improves the efficiency of assembly operation. Further, after both halves are assembled the movement of front cover 8 may be performed smoothly with shaft-holding member 71 serving as a fulcrum.

Figure 29:
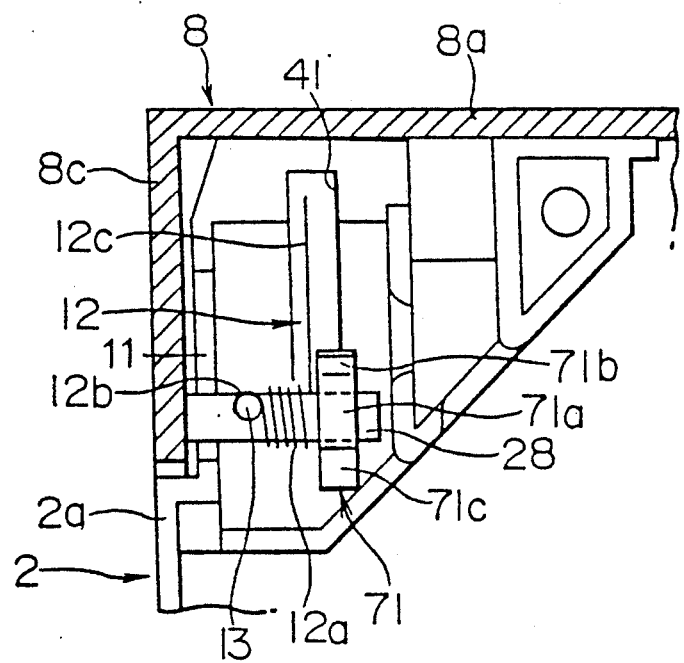
FIG. 29 shows a variation wherein a coil spring is used in the device of FIG. 27-28.

FIG. 29 shows the tip portion of rotating shaft 12 to be positioned at loading opening 11 is supported pivotally at shaft-holding member 71 shaped the same as previously set forth and is fixed on upper half 2, while the front cover spring in coil form that is similar to that of conventional cassette is mounted at the base portion of rotating shaft 12 with its fixed end 12b hooked on locking pin 13. Thus, the same effect as that in the second embodiment may be attained.

Of course, the shaft-holding member of the invention may be provided either at the base portion of the rotating shaft sandwiching the front cover spring as stated above, or at the end portion thereof or both, and the total form is not limited to those in the specific embodiments set forth so long as the holding member has a holding portion. Further, the shaft-holding member may be integral with the upper half made of material which is the same as that of the upper half.

Also, it is possible to obtain both the driving force for the front cover and the driving force for pushing and moving the front cover holding member with only one front cover spring, by using the front cover spring of the invention and by incorporating into lower half 3, the front cover locking mechanism shown in FIG. 5 and FIG. 7.

Examples of final assembly based on the invention have been disclosed above. By modifying partially the state of the final assembly of the invention, it is naturally possible to assemble front cover 8 the upper half 2 preliminarily and to assemble them finally with lower half 3.

The desirable embodiments of the front cover spring and the mounting portion therefor to be used in the embodiments of FIG. 1 and FIG. 2 will be explained next.

Figure 30:
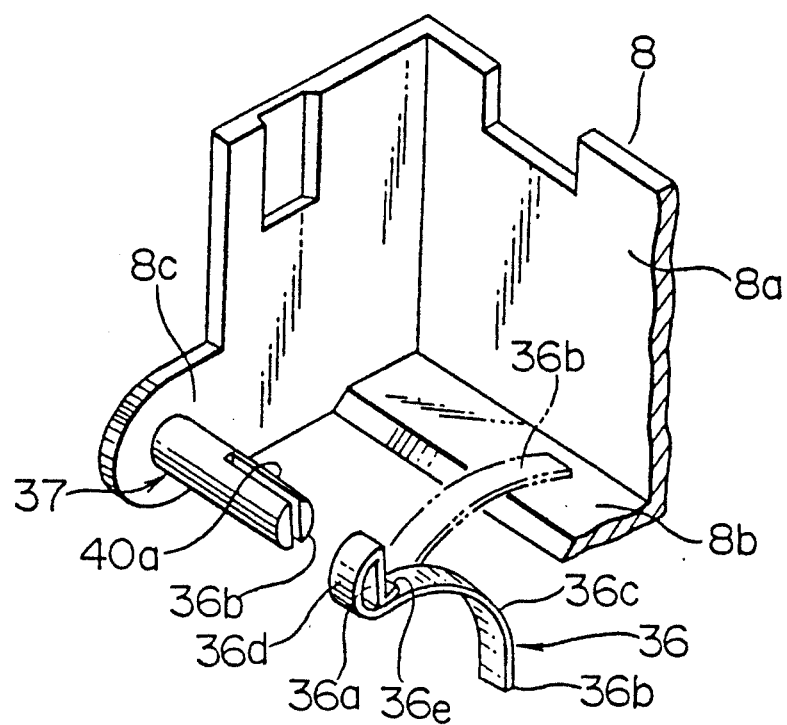
FIGS. 30-33 show the preferred form of the fixing portion of the spring.
Figure 31:
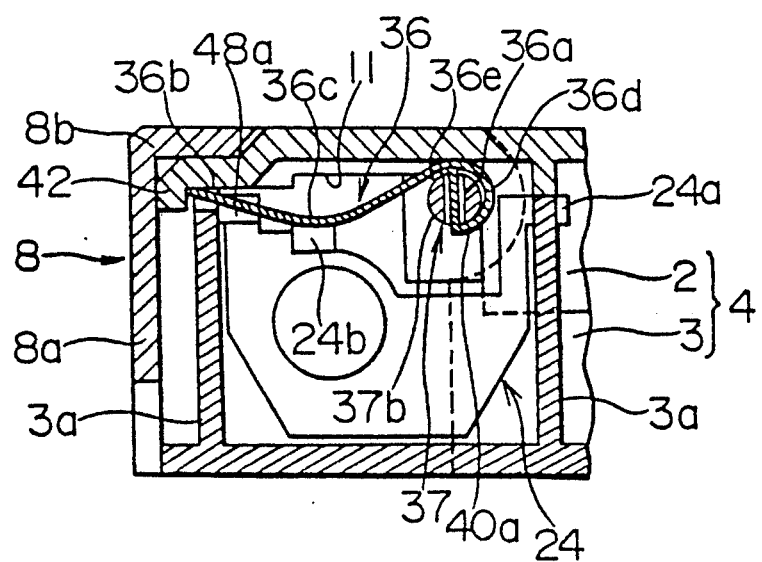

As shown in FIGS. 30 and 31, slit 40 is provided in the axial direction on the tip of rotating shaft 37 supported by loading opening 11 on front cover 8 mounted and front cover spring 36 is held in slit 40. As a desirable embodiment of the present invention, slit 40 has a width that is broader than the thickness of front cover spring 36 and a depth allowing front cover spring 36 to be inserted into the prescribed position.

Front spring 36, on the other hand, is made by bending a leaf spring cut to the required length and forming fixing portion 36a on its end. Fixing portion 36A is straight and adapted to be hooked at rotating shaft 37 to be about the same length as the diameter of rotating shaft 37. Between fixing portion 36a and tip portion 36b on the other end, there are formed spring portion 36c in a loop shape and holding portion 36d for rotating shaft 37. On the end portion of fixing portion 36a, holding end 36e is formed.

Front cover spring 36 is inserted in slit 40 of rotating shaft 37 with holding portion 36d holding the periphery of rotating shaft 37 and with fixing portion 36a advancing to the prescribed depth in slit 40. After the insertion, front cover spring 36 is to be swung to the imaginary position shown in FIG. 30 and holding end 36e is fixed to outer periphery 37b of rotating shaft 37. Tip portion 36b on the other end of the front cover spring is caused to touch the inner surface of top plate 8b of front cover 8; thus, spring portion 36c is distorted to provide a spring force which is used to cause fixing portion 36a to be spring locked in slit 40 of rotating shaft 37.

Further, when front cover 8 is mounted on upper half 2, tip portion 36b of front cover spring 36 engaged loosely with guide groove 41 touches stopper protrusion 42 and the reaction force produced therefrom causes fixing portion 36a to be in pressure-contact with slit 40. Thus, front cover spring 36 does not have any play when front cover 8 is opened or closed and is held firmly.

The front cover spring may be formed inexpensively and simply merely by bending the leaf spring material that is cut to the required length, which allows a magnetic tape cassette to be produced inexpensively.

Further, front cover spring 36 may be mounted simply and formly, on rotating shaft 37 with fixing portion 36a inserted, from the tip of rotating shaft 37, into slit 40 of rotating shaft 37 merely by locking holding end 36e. When front cover 8 is mounted on upper half 2, fixing portion 36a is fixed on a spring-loaded basis by the spring force of front cover spring 36, which assures the firm attachment.

Stainless steels, such as SUS 301H or SUS301EH (extra hard) having a Vickers hardness of $Hv^{400}$ or more, and preferably $Hv^{500}$ or more, having good elasticity and a high stiffness, are suitable for spring 36. Alternatively, a steel plate such as a ribbon steel having a width of 2.0–5.0 mm and a thickness of 0.08–0.12 mm may be used.

Figure 32:
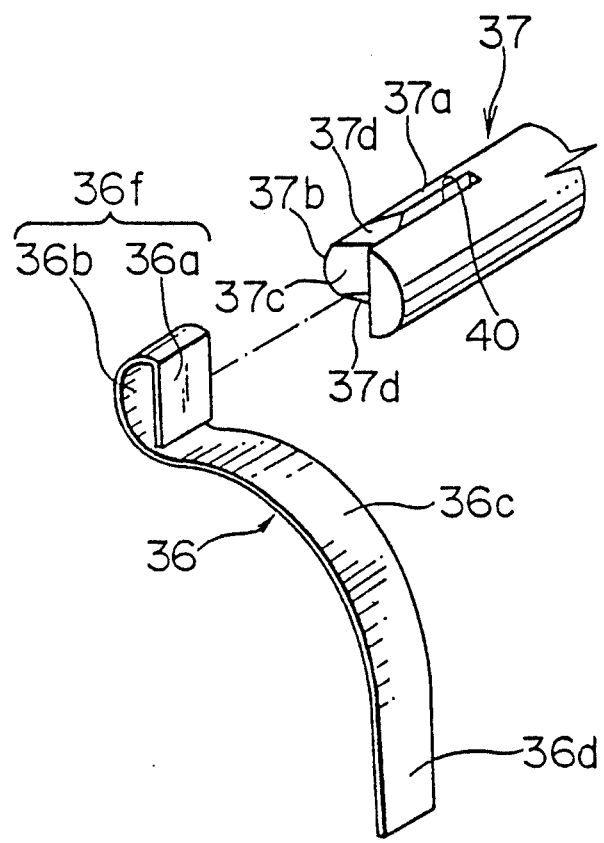
Figure 33:
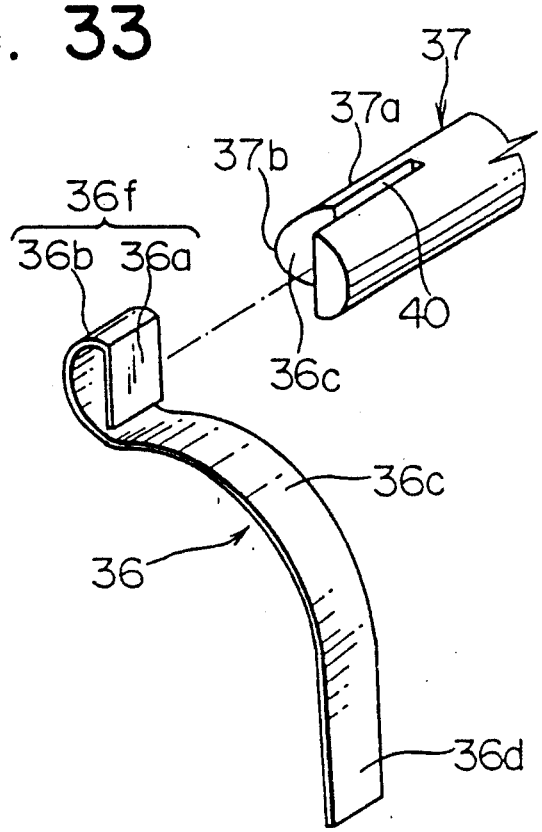

As a preferred embodiment of rotating shaft 37, the shaft is separated by slit 40 into two portions at its tip as shown in FIGS. 32 and 33, and tip 37b of holding portion 37a on one side has slant 37c that extends from the side of slit 40. Slants 37d and 37d provided at the top and bottom of slant 37c cause tip 37b of holding portion 37a to taper.

When fixing portion 36a is inserted in slit 40 with holding portion 36b of front cover spring 36 holding along holding shaft portion 37a, front cover spring 36 is fixed on the rotating shaft. Therefore, it is easy to attach and front cover spring 36 may easily be fixed on rotating shaft 37 because tip 37b of holding shaft portion 37a is tapered.

Further, FIG. 33 shows another embodiment of the invention wherein tip 37b of holding shaft portion 37a of rotating shaft 37 is tapered by face 37c which is slanted from the side of slit 40, thereby making it easy to attach front cover spring 36.

Figure 34:
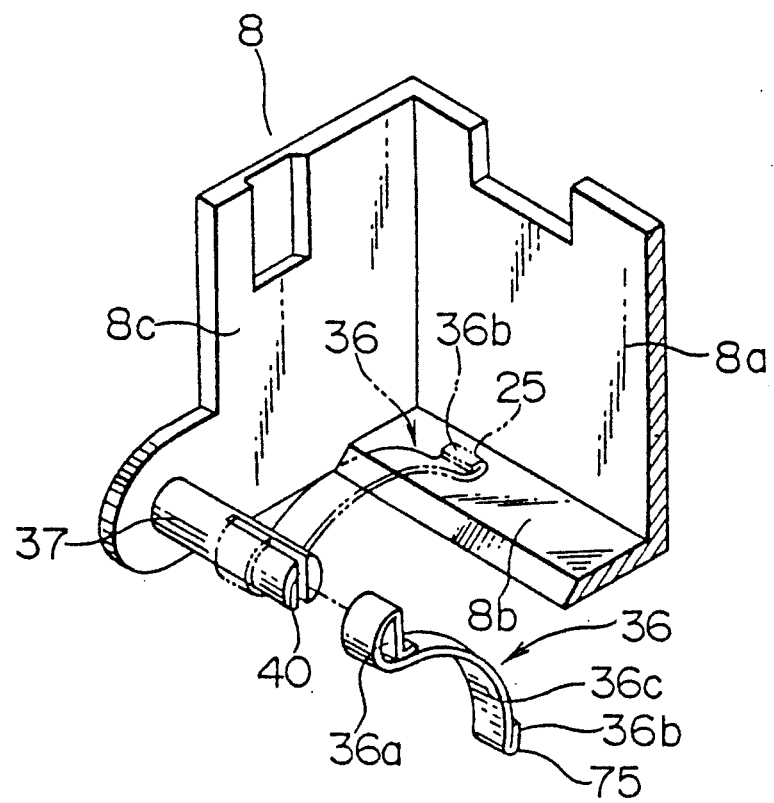
FIGS. 34-36 show the preferred form of the tip of the front cover spring.

Tip portion 36b of front cover spring 36 attached in the above-mentioned way, when front cover 8 is mounted on the upper half 2 (as shown in FIGS. 34-35), is guided by guide groove 41 formed on the inner surface of upper half 2 in its lateral direction and supported by pressure on upper half 2. Thus, the spring force to swivel front cover 8 to its closed position is produced in spring portion 36c.

Thus, it is preferable that tip portion 36b is formed so that its end portion is bent toward the fixed end 23a. It is also desired that both edge portions in the lateral direction surface 75.

When front cover 8 is opened or closed, tip portion 36b of front cover spring 36 slides along the inside of guide groove 41. In this case, however, both guide groove 41 and front cover spring 36 are not damaged and smooth operation is assured, even for an extensive opening and closing of front cover 8 because of circular arc surface 75.

The circular arc surface at the tip of the front cover spring in the present example is formed by bending. However, the circular arc surface may be formed either by rounding the end portion in a cylinder shape, or by bending in an L-shape, or by chamfering the end edge in the axial direction in a circular arc shape.

Figure 37:
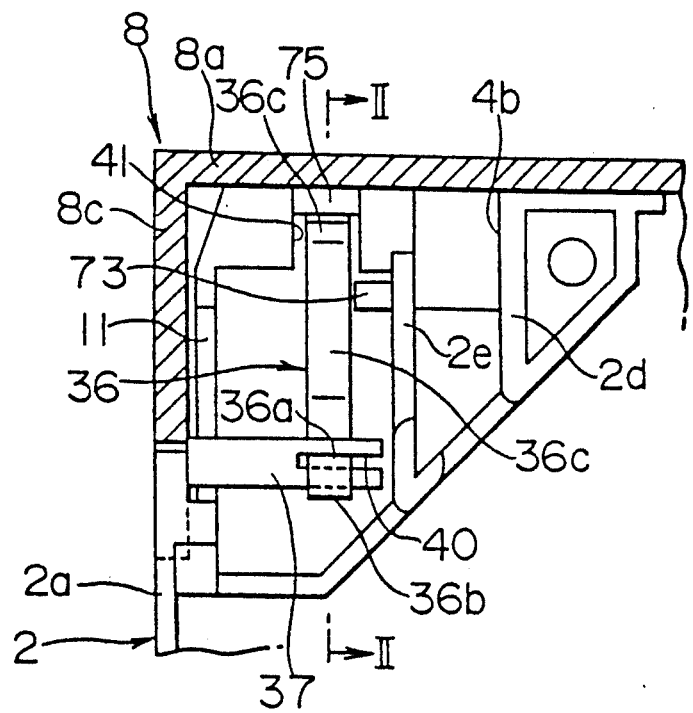
FIGS. 37-38 show a guide member provided on the side of the front cover spring.
Figure 38:
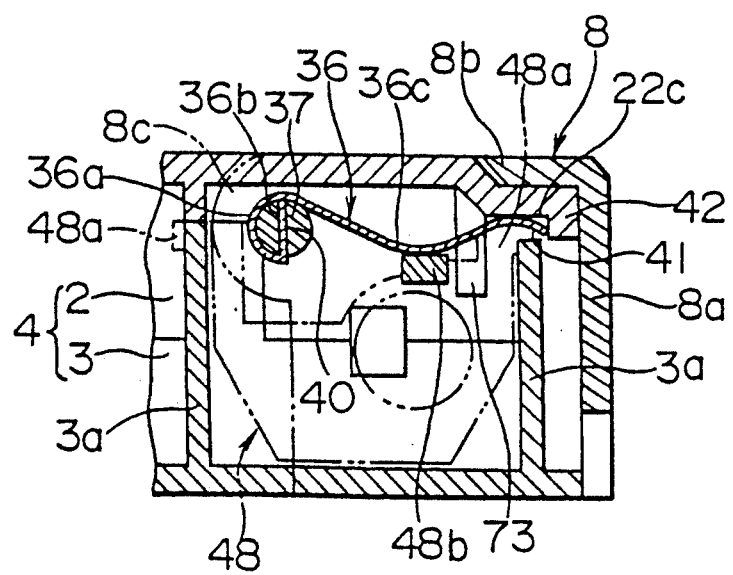
Figure 39:
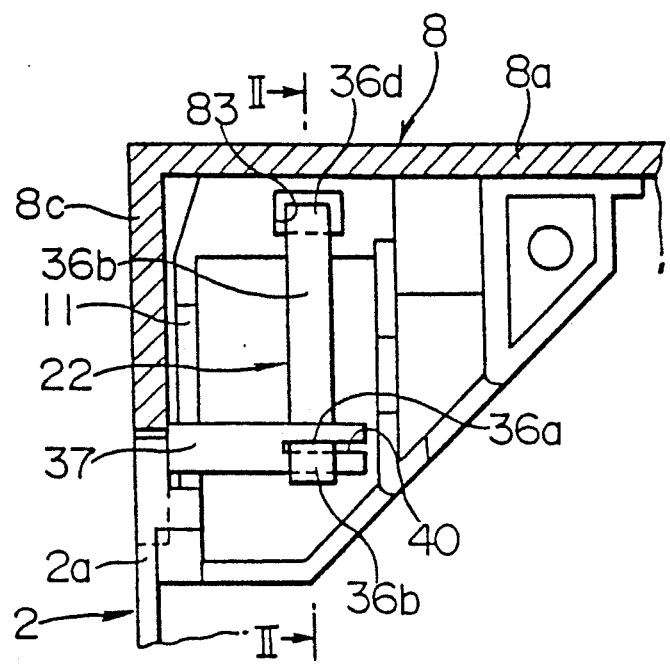
FIGS. 39-40 show a stopper recess at the tip of the front cover spring.

An example wherein a guide member for guiding the movement of a spring is further provided in addition to aforesaid guide groove will be shown next. As shown in FIGS. 37 and 38, ribs 2d and 2e are provided on an inner surface at the side of loading opening 11. At the front position of rib 2e on the side opposed to the tip of rotating shaft 37, guide protrusion 73 is provided so that it faces loading opening 11. Guide groove 41 is located at the front of upper half 2 that is opposed to slit 40 of rotating shaft 37, and stopper protrusion 42 is at the tip of guide groove 41.

The side of the free end of front cover spring 36 that is extended or shortened is constantly guided by guide protrusion 73 provided on rib 2e. Therefore, there is no play caused by the movement of the front cover and it is possible to keep it in position for attaching fixing portion 36a in slit 40 for smooth opening and closing.

The guide protrusion is provided by the use of the rib that forms the guide groove in which the actuator of a VTR is to be inserted. However, the invention is not limited to this and, for example, the guide protrusion may be provided directly on the inner surface of the upper half.

Figure 36:
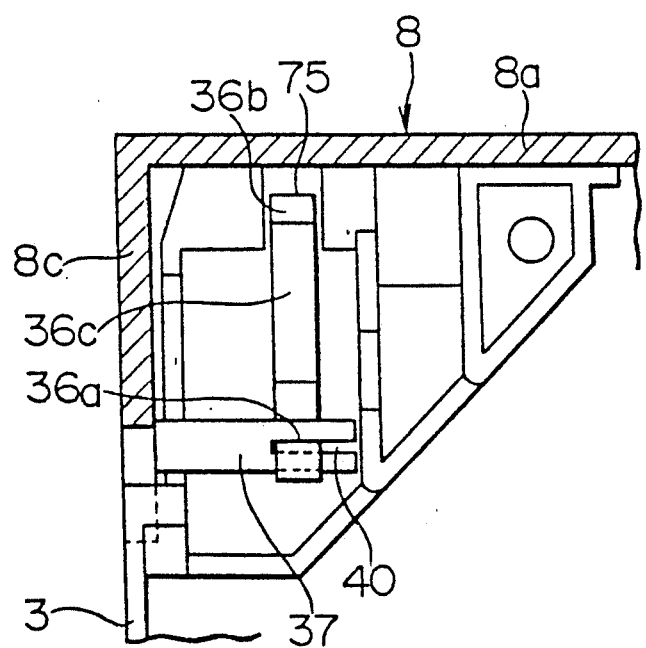

The holding end may be formed by bending the end portion of the fixing portion of the front cover spring, the circular arc surface can be formed by folding the end portion at the free end side of the front cover spring, the slanted surface may be located on the slit of the rotating shaft, and the guide protrusion may also be used as a preferable embodiment even when no stopper protrusion is provided, as shown in FIGS. 35 and 36.

FIGS. 35, 36, 39 and 40 show devices wherein no stopper protrusion is provided.

When front cover 8 is mounted on upper half 2, tip 36b engages stopper recess 83 and thus front cover spring 36 is held with pressure on upper half 2. Spring portion 36c is deformed toward lower half 3 by the engagement of tip 36b and the spring force is thereby stored in front cover spring 36 which forces rotating shaft 37 counterclockwise (as seen in FIG. 40) front cover 8 is urged toward its closed position.

Figure 40:
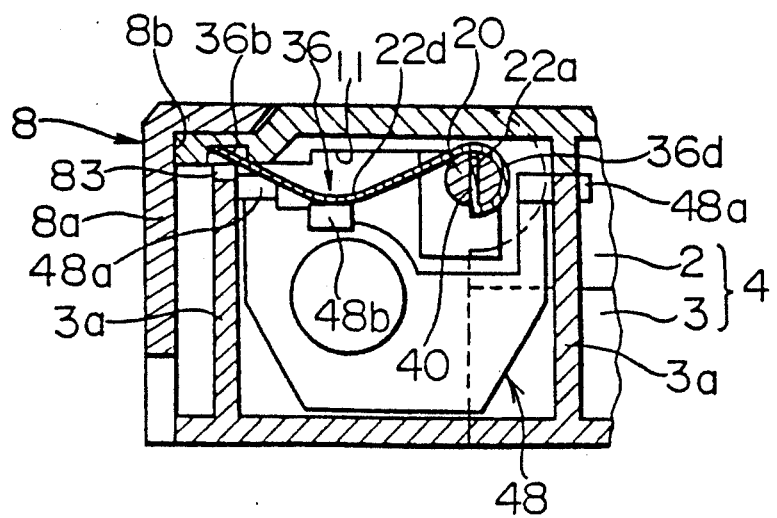

When front cover 8 is opened after tape cassette 1 is inserted in a VTR, rotating shaft 37 is swiveled clockwise (as shown in FIG. 40) and front cover spring 36 is wound around rotating shaft 37 with tip 36b maintained in engagement with the stopper recess 83. Thus, the loop shape of spring portion 36c becomes smaller and leaves protruded piece 48b on front cover holding member 48.

When front cover 8 is closed after tape cassette 1 is taken out of a VTR, rotating shaft 37 is rotated counterclockwise (see in FIG. 40) by the restoring force of spring portion 36c cover spring 36 that swells downward. Thus, spring portion 36c moves the protruded piece on front cover holding member 48 and front cover 8 is urged into its closed position.

Figure 41:
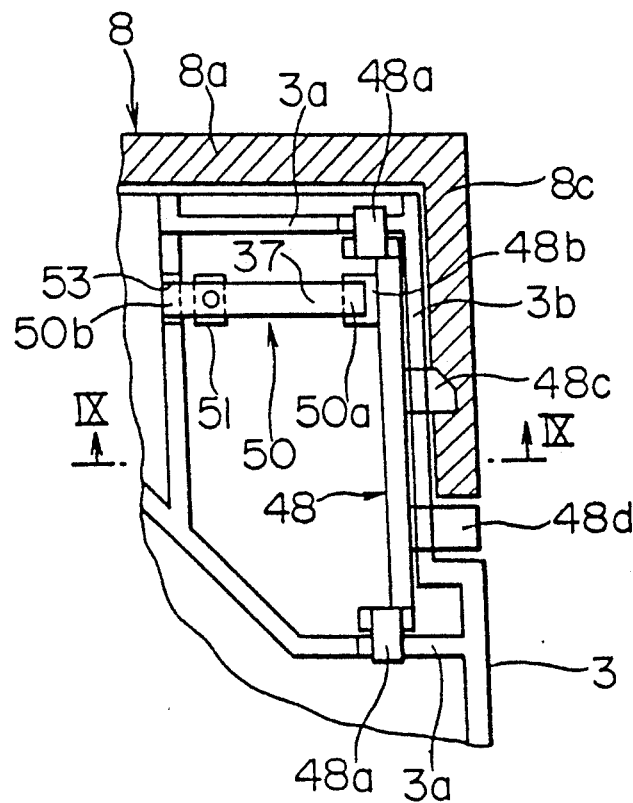
FIGS. 41-44 show another embodiment of the front cover locking mechanism.
Figure 42:
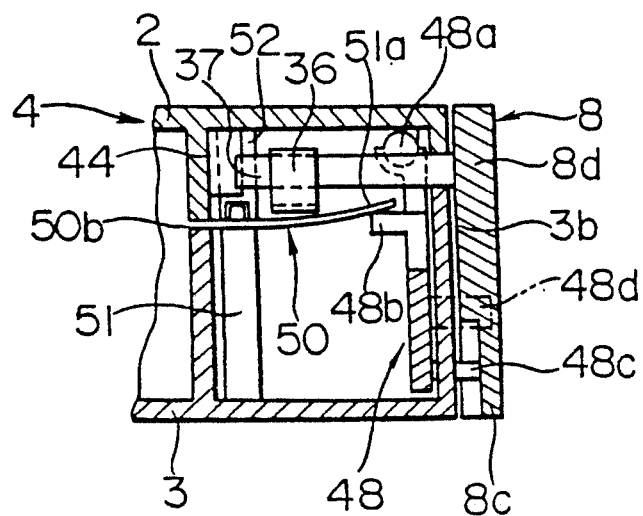

The variety of the locking mechanism for the front cover disclosed in FIGS. 1 to 10 will be explained next. In FIGS. 41 and 42, front cover 8 is kept closed With front cover holding member spring 50 in a form of a plate different from front cover spring 36. Front cover holding member spring 50 is pivotally supported at the top portion of column 51 provided on lower half 3 and is attached with the top of the spring fixed by being pinched and pressed by boss 52 and with tip 50a caused to contact protruded piece 48b for the rotation of front cover holding member 48 with pressure and with rear end 50b engaging holding lower half 3. Locking protrusion 48c and releasing protrusion 48d protrude from side wall 3b by the force of front cover holding member spring 50. Locking protrusion 48c holds front cover 8 in its closed position through engagement with front cover 8.

Figure 43:
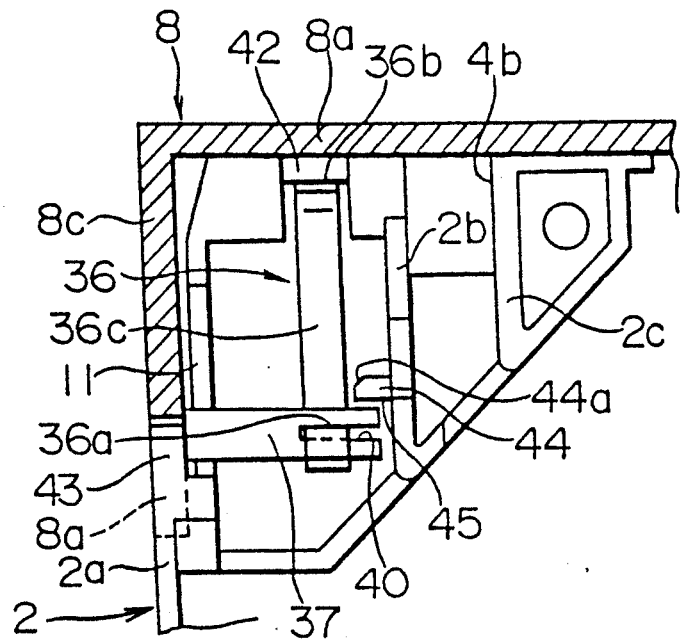
Figure 44:
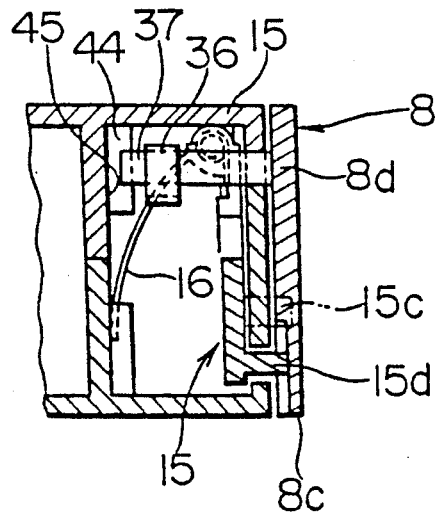
Figure 45:
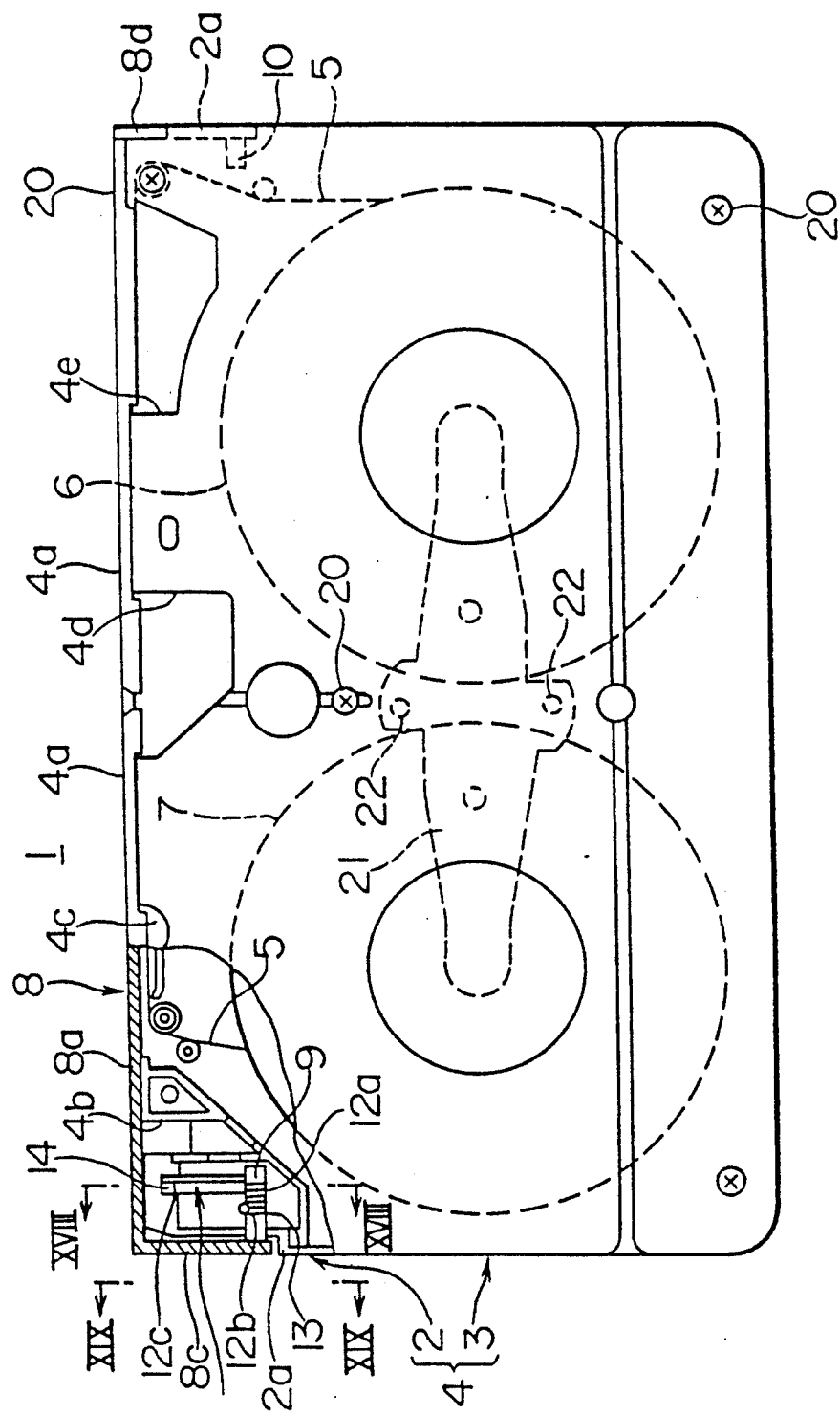
FIG. 45 is a rear view with a partial cutout of a conventional magnetic tape cassette viewed from the lower half side.

FIGS. 43 and 44 show a variation on the device of FIGS. 41 and 42. Front cover holding member spring 16 of the same coil shape as in conventional cassette is attached to supported shaft 15a on one side of front member 15 so that the force of spring 16 moves front coVer holding member 15. Locking protrusion 15b and releasing protrusion 15d protrude from lower half 3b; thus, front cover 8 is kept closed. Front cover 8 is mounted on upper half 2 with rotating shaft 37 whose tip and the base portion are supported by stepped portion 45 formed with both stopper protrusion 44 and partition wall 2b, and by holding stopper 43, respectively.

The construction of the area where the top plate of the upper half and the top plate of the front cover touch each other will be explained next.

Figure 51:
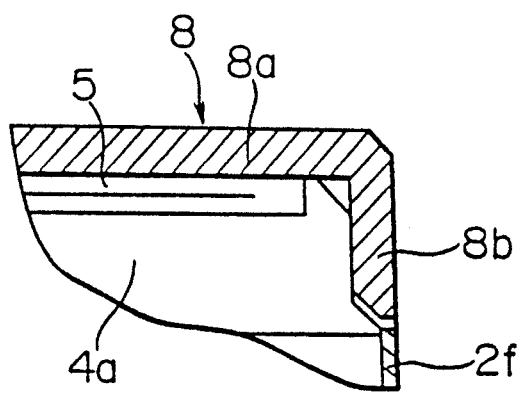
FIG. 51 represents a sectional view of the main portion showing the conventional structure of the contacting part between the top plate of the upper half and the front cover top plate.

FIG. 51 shows a conventional cassette wherein clearance is produced between the front edge of top plate 2f and the edge of top plate 8b which causes concern that dust may enter into the cassette body and adversely affects the appearance of the cassette.

Figure 52:
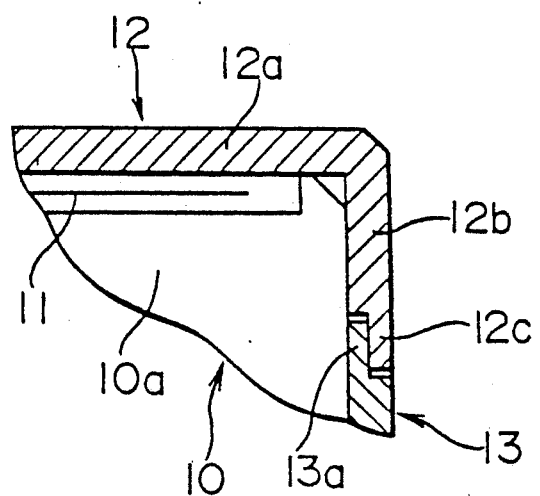
FIG. 52 is a view similar to that of FIG. 50 in accordance with the present invention.

In FIG. 52 shows the present invention. Cover portion 12c is cut off in step form at its bottom face and is located in the direction of its width on the edge of top plate 12b extending from the front plate of front cover 12. On the front edge of upper half 13 of cassette body 10, covered portion 13a, is formed and has on its top face a step that is substantially equal to the thickness of cover portion 12c.

Front cover 12 may be mounted in cassette body 10 with the top surfaces of its top plate 12b and cover portion 12c substantially aligned with the top surface of upper half 13. Cover portion 12c and covered portion 13a overlap without any clearance between the front edge of upper half 13 and top plate 12b. Thus, it is possible to prevent dust from entering the cassette body and to further prevent warping of front plate 12a because of greater width of top plate 12, thereby improving the appearance and grade of the magnetic cassette tape.

In the present invention, as stated above, a cover portion whose bottom face is cut off in step form is provided on the edge of the top plate of the front cover to be mounted at the front of the magnetic tape cassette body so that the front cover can open and close. On the front edge of the upper half, a covered portion having a step that is substantially equal to the thickness of the cover portion is formed at the front edge of the upper half. In the closed state of the front cover, therefore, the front edge of the upper half and the edge of the top plate of the front cover overlap each other, providing no clearance between them, which eluminates and concern for the entry of dust into the cassette body, and greater width of the top plate of the invention prevents warping of the front plate and improves the appearance and grade.

In the magnetic tape cassette of the invention, a loading opening that is opened toward the lower half is provided on the side wall of the front portion of the upper half, the rotating shaft on one side of the front cover is located at the inner corner of the loading opening, a holding protrusion which blocks the axial movement of the rotating shaft toward the lower half is at the loading opening, and a stopper protrusion that blocks the movement of the rotating shaft toward the front of the cassette is provided in the vicinity of the tip of the rotating shaft inside the upper half. Therefore, owing to both holding protrusion and stopper protrusion, the front cover may be firmly mounted on the upper half and kept thereon without coming off. Thus. the loss of the front cover spring may be prevented, which eliminates the wasteful re-assembling and improves an efficiency of manufacture.

What is claimed is:

1. A magnetic tape cassette comprising,
    an upper half having two side plates, one of said side plates having a hole and the other of said side plates having an opening toward an inserting direction of the cassette;
    a lower half complementary to the upper half forming a cassette body; and
    a front cover pivotally mounted on the upper half said front cover having two side members facing said side plates, said side members having first and second shafts, said first shaft being mounted in said hole, said second shaft having a leaf-shaped spring member for pivotally biasing the front cover attached thereto, said second shaft being in said opening;
    said leaf-shaped spring member urging said front cover toward a closing position, and keeping said front cover in an assembling position before said upper half and said lower half are assembled.

2. The cassette of claim 1
    wherein said leaf-shaped spring member is arch shaped.

3. The cassette of claim 2
    wherein said leaf-shaped member is attached to said second shaft and a free end of the said leaf-shaped spring member holds said front cover and stray at a predetermined position of said upper half.

* * * * *